United States Patent
Itou et al.

(10) Patent No.: US 11,593,618 B2
(45) Date of Patent: Feb. 28, 2023

(54) DATA PROCESSING APPARATUS, DATA PROCESSING METHOD, AND STORAGE MEDIUM

(71) Applicants: Kabushiki Kaisha Toshiba, Minato-ku (JP); Toshiba Digital Solutions Corporation, Kawasaki (JP)

(72) Inventors: Hidemasa Itou, Inagi (JP); Yukio Kamatani, Kawasaki (JP)

(73) Assignees: Kabushiki Kaisha Toshiba, Tokyo (JP); Toshiba Digital Solutions Corporation, Kawasaki (JP)

(*) Notice: Subject to any disclaimer, the term of this patent is extended or adjusted under 35 U.S.C. 154(b) by 459 days.

(21) Appl. No.: 16/789,515

(22) Filed: Feb. 13, 2020

(65) Prior Publication Data

US 2020/0265295 A1 Aug. 20, 2020

(30) Foreign Application Priority Data

Feb. 19, 2019 (JP) .............................. JP2019-027784

(51) Int. Cl.
  *G06N 3/04* (2006.01)
  *G06F 16/901* (2019.01)
  *G06N 3/08* (2023.01)
(52) U.S. Cl.
  CPC ........ *G06N 3/0454* (2013.01); *G06F 16/9024* (2019.01); *G06N 3/08* (2013.01)
(58) Field of Classification Search
  CPC ............ G06F 16/9024; G06F 16/3329; G06N 3/0454; G06N 3/08; G06N 3/084;
  (Continued)

(56) References Cited

U.S. PATENT DOCUMENTS 10,599,686 B1* 3/2020 Busbridge ........... G06F 16/9024
2019/0309979 A1* 10/2019 Hurley .................... F24F 11/65
2021/0192358 A1* 6/2021 Song ..................... G06N 3/0454

FOREIGN PATENT DOCUMENTS

JP         2017-182710 A     10/2017
JP           2018-5739 A      1/2018
WO    WO 2016/194248 A1   12/2016

OTHER PUBLICATIONS

Pak et al, "A hybrid model based on convolutional neural networks and long short-term memory for ozone concentration prediction", Aug. 16, 2018, Air Quality, Atmosphere & Health (2018) 11:883-895.*

(Continued)

*Primary Examiner* — Xilin Guo
(74) *Attorney, Agent, or Firm* — Maier & Maier, PLLC

(57) ABSTRACT

A data processing apparatus according to an embodiment includes a data acquisition unit, a setting unit, and a reinforcement learning unit. The data acquisition unit acquires graph-structured data describing a connection relation between nodes. The setting unit sets a first network representing the graph-structured data acquired by the data acquisition unit. The reinforcement learning unit derives a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward.

10 Claims, 25 Drawing Sheets

(58) Field of Classification Search
CPC ............... G06N 3/04; G06N 7/005; G06T 2207/20084; G06T 2207/20081
See application file for complete search history.

(56) References Cited

OTHER PUBLICATIONS

Japanese Third Party Observation issued Apr. 12, 2022 in Japanese Patent Application No. 2019-027784 (with English translation), 6 pages.

* cited by examiner

CONVERTED INTO ASSUMED NODES

POWER FLOW CALCULATION MODEL

STATE
/BUS VOLTAGE

ACTION:
- SWITCHING POSITIONS OF TRANSFORMERS $t_{47}$, $t_{49}$, and $t_{56}$
- SWITCHING POSITION OF SHUNT CIRCUIT $b_9$

3
DATA PROCESSING APPARATUS

FIG. 22

Reward Distribution Matrix $D_\phi$

| NODE | $N_{r1}$ | $N_{r2}$ | $N_{r3}$ | $N_{r4}$ | $N_{a1}$ | $N_{a2}$ | $N_{a3}$ |
|---|---|---|---|---|---|---|---|
| $N_{a1}$ | 0.5 | 0.4 | 0.1 | 0.4 | 0.6 | 0.3 | 0.1 |
| $N_{a2}$ | 0.5 | 0.4 | 0.4 | 0.1 | 0.3 | 0.6 | 0.1 |
| $N_{a3}$ | 0 | 0.2 | 0.5 | 0.5 | 0.1 | 0.1 | 0.8 |

×

Combined Reward Vector $R_{t+1}$

| NODE | REWARD |
|---|---|
| $N_{r1}$ | 4 |
| $N_{r2}$ | 2 |
| $N_{r3}$ | -10 |
| $N_{r4}$ | -2 |
| $N_{a1}$ | 3 |
| $N_{a2}$ | 1 |
| $N_{a3}$ | 2 |

=

Reward Vector $R_t$

| NODE | REWARD |
|---|---|
| $N_{a1}$ | 3.3 |
| $N_{a2}$ | 0.3 |
| $N_{a3}$ | -3.6 |

FIG. 25

REWARD DISTRIBUTION MATRIX $D_\phi$

| NODE | $N_{r1}^{t+2}$ | $N_{r2}^{t+2}$ | $N_{r3}^{t+2}$ | $N_{r4}^{t+2}$ | $N_{all}^{t+2}$ |
|---|---|---|---|---|---|
| $N_{a1}^{t}$ | 0.75 | 0.5 | 0.1 | 0.1 | 0.2 |
| $N_{a3}^{t+1}$ | 0.25 | 0.5 | 0.9 | 0.9 | 0.8 |

×

COMBINED REWARD VECTOR $R'_{t+2}$

| NODE | REWARD |
|---|---|
| $N_{r1}^{t+2}$ | 4 |
| $N_{r2}^{t+2}$ | 2 |
| $N_{r3}^{t+2}$ | −10 |
| $N_{r4}^{t+2}$ | −2 |
| $N_{all}^{t+2}$ | 3 |

=

REWARD VECTOR $(R_t, R_{t+1})^T$

| | REWARD |
|---|---|
| $R_t$ | 3.3 |
| $R_{t+1}$ | 0.3 |

DATA PROCESSING APPARATUS, DATA PROCESSING METHOD, AND STORAGE MEDIUM

CROSS-REFERENCE TO RELATED APPLICATION

This application is based upon and claims the benefit of priority from Japanese Patent Application No. 2019-027784, filed on Feb. 19, 2019, the entire contents of which are incorporated herein by reference.

BACKGROUND

Field

Embodiments described herein relate generally to a data processing apparatus, a data processing method, and a storage medium.

Description of Related Art

In recent years, attempts have been made to utilize artificial intelligence in industrial fields. There are many artificial intelligence technologies that are being considered for use such as deep learning and related technologies and their application range is expanding to image recognition, failure analysis, characteristic prediction, and the like.

There have also been attempts to use artificial intelligence to automate the control and operation of a real system or its simulation environment. For example, significant investments have been made in automated driving and the like. Artificial intelligence here is called reinforcement learning. In reinforcement learning, an action (control signal) is input from a reinforcement learning agent to a system or its simulation environment and the system makes a state transition in response to the action. The system state is fed back to the reinforcement learning agent and an evaluation function (such as a reward value or a penalty) according to the system state fed back is calculated. The reinforcement learning agent updates parameters of a learning network to optimize the evaluation function and generates a new action. The learning network here mainly uses deep learning. Recently, cases where reinforcement learning is applied to social infrastructure systems, for example, such as building air conditioning management and power grid control, have also been reported. Efforts to apply artificial intelligence to these social infrastructure systems are expected to increase in the future.

However, reinforcement learning of the related art employs a typical fully connected neural network as a learning network and therefore may fail to properly follow an actual state of a control target or may involve an excessive processing load. In addition, large-scale relearning may be required for a design change of a control target.

SUMMARY

It is an object of the present invention to provide a data processing apparatus, a data processing method, and a storage medium which can learn a network for controlling a control target more accurately and with a lower load.

A data processing apparatus according to an embodiment includes a data acquisition unit, a setting unit, and a reinforcement learning unit. The data acquisition unit acquires graph-structured data describing a connection relation between nodes. The setting unit sets a first network representing the graph-structured data acquired by the data acquisition unit. The reinforcement learning unit derives a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward.

BRIEF DESCRIPTION OF THE DRAWINGS

FIG. 22 is a diagram showing an example of how a reward vector $R_t$ is derived.

FIG. 25 is a diagram showing an example of how a reward vector $(R_t, R_{t+1})^T$ is derived.

DETAILED DESCRIPTION

Hereinafter, a data processing apparatus, a data processing method, and a storage medium according to an embodiment will be described with reference to the drawings.

Figure 1:
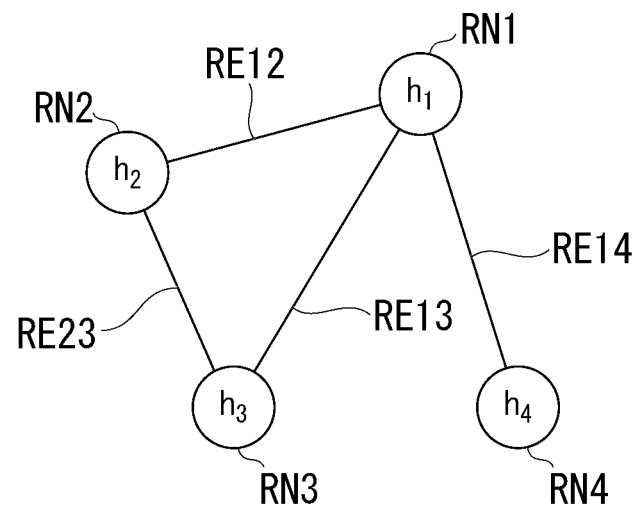
FIG. 1 is a diagram showing how a neural network is generated from graph-structured data according to a method of the related art.
Figure 1:
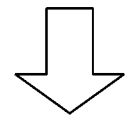
Figure 1:
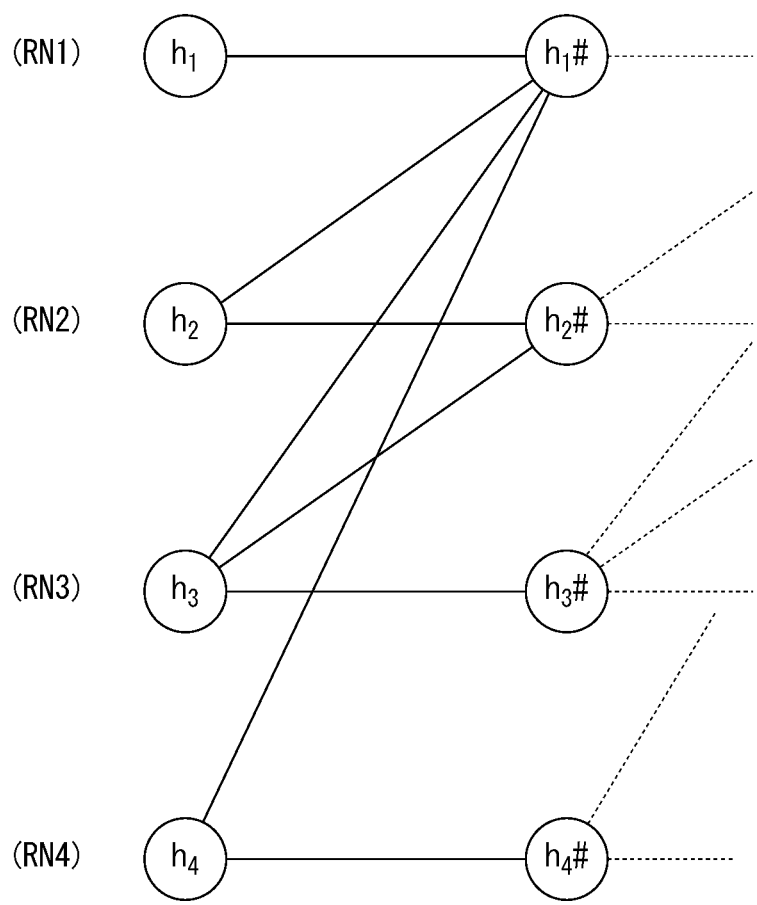

First, the principle of a neural network generated by the data processing apparatus will be described. FIG. 1 is a diagram showing how a neural network is generated from graph-structured data according to a method of the related art.

An upper part of FIG. 1 schematically shows graph-structured data. There are real nodes RN1 to RN4 in the shown configuration. A "real node" is a concept for distinguishing it from an "assumed node" that will be described later, and is a node in graph-structured data (data to be processed or source data) acquired by the data processing apparatus. Thus, the graph-structured data is data that at least describes the connection relations between nodes. The real node RN1 has a feature quantity $h_1$, the real node RN2 has a feature quantity $h_2$, the real node $RN_3$ has a feature quantity $h_3$, and the real node RN4 has a feature quantity $h_4$. A feature quantity is, for example, a vector. Scalars and vectors are not distinguished in terms of notation in the present specification and drawings.

In the upper part of FIG. 1, the real nodes RN1 and RN2 are connected by a real edge RE12, the real nodes RN1 and RN3 are connected by a real edge RE13, the real nodes RN1 and RN4 are connected by a real edge RE14, and the real nodes RN2 and RN3 are connected by a real edge RE23. A "real edge" is a concept for distinguishing it from an "assumed edge" that will be described later, and is an edge in graph-structured data acquired by the data processing apparatus. "Connected" here indicates a relation in which two feature quantities affect each other in the next state. This definition assumes an undirected graph. However, when a directed graph is handled, "connected" indicates a relation in which one feature quantity affects the other feature quantity in the next state.

A lower part of FIG. 1 shows an example of a neural network generated based on the graph-structured data shown in the upper part of FIG. 1. $h_1$ #, $h_2$ #, $h_3$ #, and $h_4$ # are feature quantities in a first intermediate layer of the real nodes RN1, RN2, RN3, and RN4. As shown, the real edges RE in the upper part of FIG. 1 form the same connection structure in the neural network. Here, the feature quantity $h_1$ # is represented by equation (1). In this equation, $\alpha_{1,1}$ to $\alpha_{1,4}$ are coefficients indicating the degree of propagation. As described above, the feature quantity of a kth layer of a real node RN is obtained by summing the feature quantities of a k−1th layer of the real node RN and other real nodes RN which are in a connection relation with the real node RN, multiplied by corresponding coefficients and a propagation matrix W. The propagation matrix will be described later.

$$h_1 \# = \alpha_{1,1} \cdot W \cdot h_1 + \alpha_{1,2} \cdot W \cdot h_2 + \alpha_{1,3} \cdot W \cdot h_3 + \alpha_{1,4} \cdot W \cdot h_4 \tag{1}$$

First Embodiment

Figure 2:
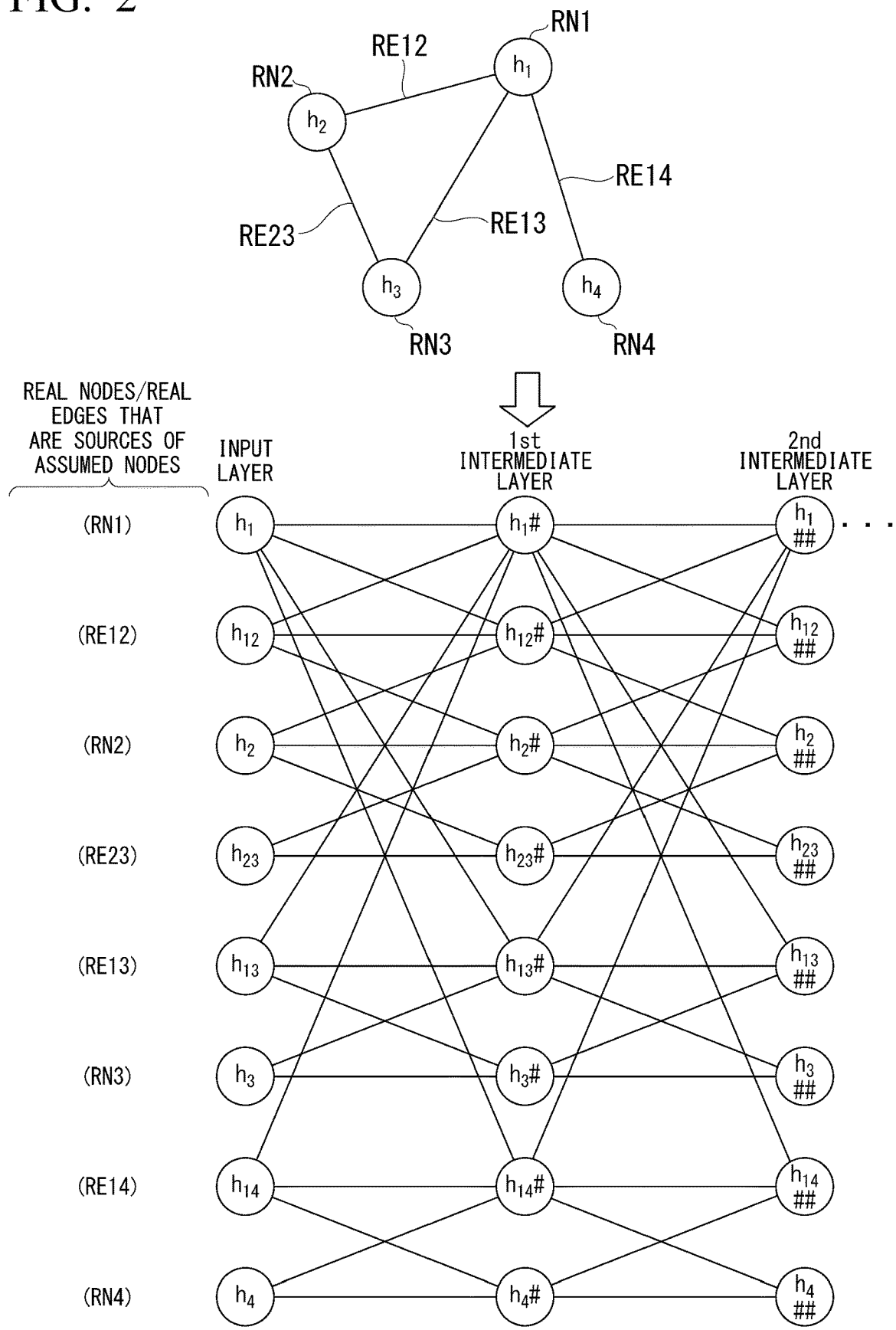
FIG. 2 is a diagram showing how a neural network is generated from graph-structured data according to a method of a first embodiment.

FIG. 2 is a diagram showing how a neural network is generated from graph-structured data according to a method of a first embodiment. As shown, a data processing apparatus according to the first embodiment sets assumed nodes AN including not only real nodes RN but also real edges RE and generates a neural network for propagating the feature quantity of a k−1th layer of an assumed node AN to the feature quantities of a kth layer of the assumed node AN and other assumed nodes AN that are in a connection relation with the assumed node AN. k is a natural number of 1 or more and a layer of k=0 is, for example, an input layer.

The data processing apparatus determines the feature quantity of a first intermediate layer, for example, on the basis of equation (2). Equation (2) corresponds to a method for calculating the feature quantity $h_1$ # of the first intermediate layer of an assumed node (RN1). As an example, $\alpha_{1,12}$ is a coefficient indicating the degree of propagation between the assumed node (RN1) and an assumed node (RE12). The feature quantity $h_1$ ## of a second intermediate layer of the assumed node (RN1) is represented by equation (3). Feature quantities are sequentially determined in third and subsequent intermediate layers according to the same rule.

$$h1 \# = +\alpha_{1,1} \cdot W \cdot h_1 + \alpha_{1,12} \cdot W \cdot h_{12} + \alpha_{1,13} \cdot W \cdot h_{13} + \alpha_{1,14} \cdot W \cdot h_{14} \tag{2}$$

$$h1 \#\# = \alpha_{1,1} \cdot W \cdot h_1 \#+\alpha_{1,12} \cdot W \cdot h_{12} \#+\alpha_{1,13} \cdot W \cdot h_{13} \#+\alpha_{1,14} \cdot W \cdot h_{14} \# \tag{3}$$

Figure 3:
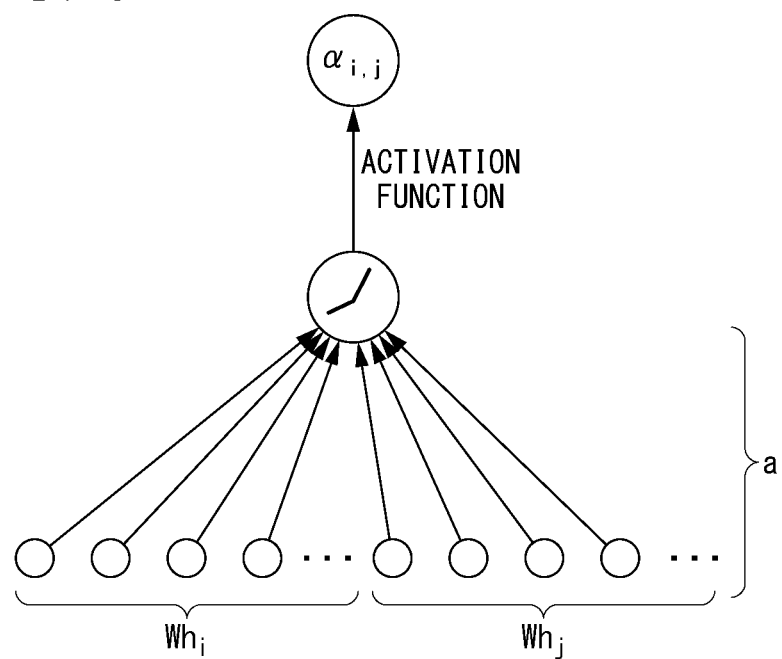
FIG. 3 is a diagram illustrating a method in which a data processing apparatus according to the first embodiment determines a coefficient $\alpha_{i,j}$.

The data processing apparatus determines the coefficient $\alpha_{i,j}$, for example, according to a rule based on a graph attention network. FIG. 3 is a diagram illustrating a method in which the data processing apparatus determines the coefficient $a_{i,j}$. The data processing apparatus derives the coefficient $\alpha_{i,j}$ by inputting a vector $(Wh_i, Wh_j)$, which combines a vector $Wh_i$ obtained by multiplying the feature quantity $h_i$ of an assumed node $RN_i$ that is a propagation source by the propagation matrix W and a vector $Wh_j$ obtained by multiplying a feature quantity $h_j$ of an assumed node $RN_j$ that is a propagation target by the propagation matrix W, to an individual neural network a (attention), inputting vectors of an output layer of the network to an activation function such as a sigmoid function, a ReLU, or a softmax function to normalize the vectors, and summing them. In the individual neural network a, parameters or the like are obtained in advance for an event to be analyzed.

The data processing apparatus determines the parameters (W, $\alpha_{i,j}$) of the neural network such that they meet the purpose of the neural network while following the rule described above. The purpose of the neural network is to output a future state when the assumed node AN is set as the current state, to output an index for evaluating the current state, or to classify the current state.

Figure 4:
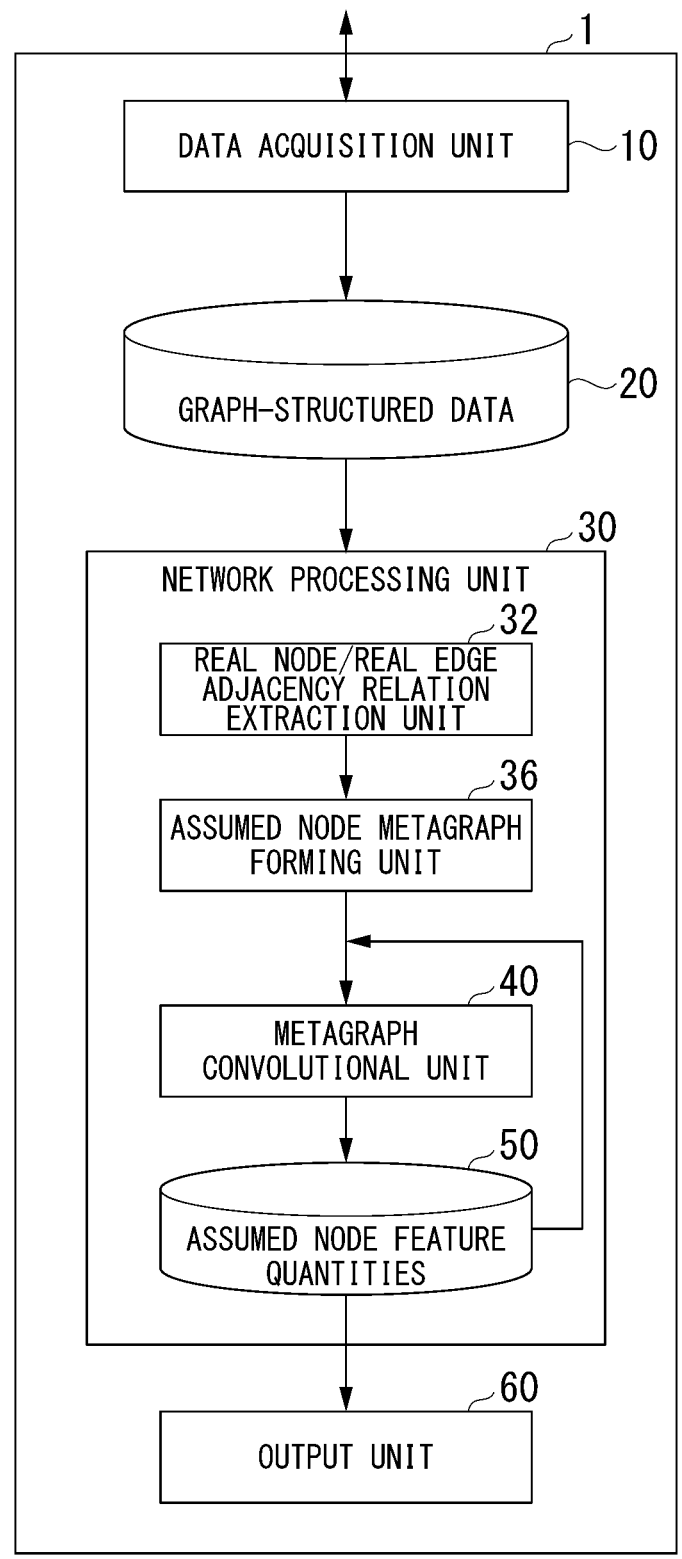
FIG. 4 is a block diagram of the data processing apparatus according to the first embodiment.

FIG. 4 is a block diagram of a data processing apparatus 1 according to the first embodiment. The data processing apparatus 1 includes, for example, a data acquisition unit 10, a network processing unit 30, and an output unit 60. These functional units are realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by hardware and software in cooperation. The program may be stored in advance in a storage device such as a hard disk drive (HDD) or a flash memory or may be stored in a detachable storage medium such as a DVD or a CD-ROM and then installed in the storage device by mounting the storage medium in a drive device.

The data acquisition unit 10 acquires, for example, graph-structured data 20 from an external device and stores the graph-structured data 20 in a storage unit. The storage unit is realized, for example, by a random access memory (RAM), a hard disk drive (HDD), or a flash memory. The graph-structured data 20 is data that expresses, for example, a graph structure as shown in the upper parts of FIGS. 1 and 2 as records of real nodes RN and real edges RE. Feature quantities as initial states of real nodes RN may be assigned to the graph-structured data 20. Note that the feature quantities as initial states of the real nodes RN may be prepared as a data set different from the graph-structured data 20. Instead of acquiring the graph-structured data 20 from an external device, the data acquisition unit 10 may acquire (read) the graph-structured data 20 stored in advance in the storage unit or may acquire graph-structured data 20 that a user has input using an input device.

The network processing unit 30 includes, for example, a real node/real edge adjacency relation extraction unit 32, an assumed node metagraph forming unit 36, and a metagraph convolutional unit 40.

The real node/real edge adjacency relation extraction unit 32 refers to the graph-structured data 20 to extract real nodes RN and real edges RE that are in an adjacency relation (connection relation). For example, the real node/real edge adjacency relation extraction unit 32 exhaustively extracts, for each of the real nodes RN and the real edges RE, real nodes RN or real edges RE which are in an adjacency relation (connection relation) with each of the real nodes RN and the real edges RE and stores each of the real nodes RN and the real edges RE in the storage unit in association with the extracted real nodes RN or real edges RE.

The assumed node metagraph forming unit 36 generates a neural network that connects the states of assumed nodes AN in a layered manner such that real nodes RN and real edges RE extracted by the real node/real edge adjacency relation extraction unit 32 are connected. At this time, the assumed node metagraph forming unit 36 determines the propagation matrix W and the coefficient $\alpha_{i,j}$ such that they meet the purpose of the neural network described above while following the rule based on the graph attention network described above.

For example, the metagraph convolutional unit 40 inputs feature quantities as initial values of real nodes RN among the assumed nodes AN to the neural network to derive states (feature quantities) of the assumed nodes AN in each layer. By repeatedly executing this, the output unit 60 externally outputs the feature quantities of the assumed nodes AN.

According to the first embodiment described above, it is possible to meet a wider range of needs.

Second Embodiment

Hereinafter, a second embodiment will be described. In the second embodiment, a data processing apparatus sets types for at least one of real nodes RN or real edges that are sources of assumed nodes AN (that is, sets types for the assumed nodes AN) and changes, for each type, the rule for setting a coefficient. More specifically, the data processing apparatus makes a propagation matrix W for determining a coefficient $\alpha_{i,j}$, which defines a feature quantity propagated from an assumed node AN, different for each type of the assumed node AN.

Figure 5:
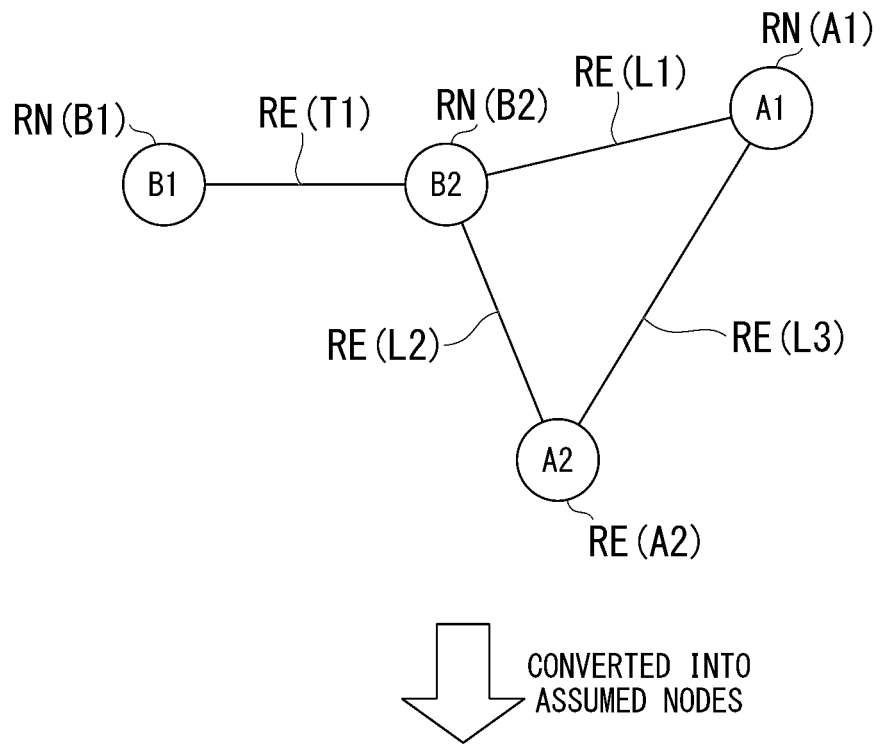
FIG. 5 is a diagram showing an example of the definition of the type of an assumed node AN.
Figure 5:
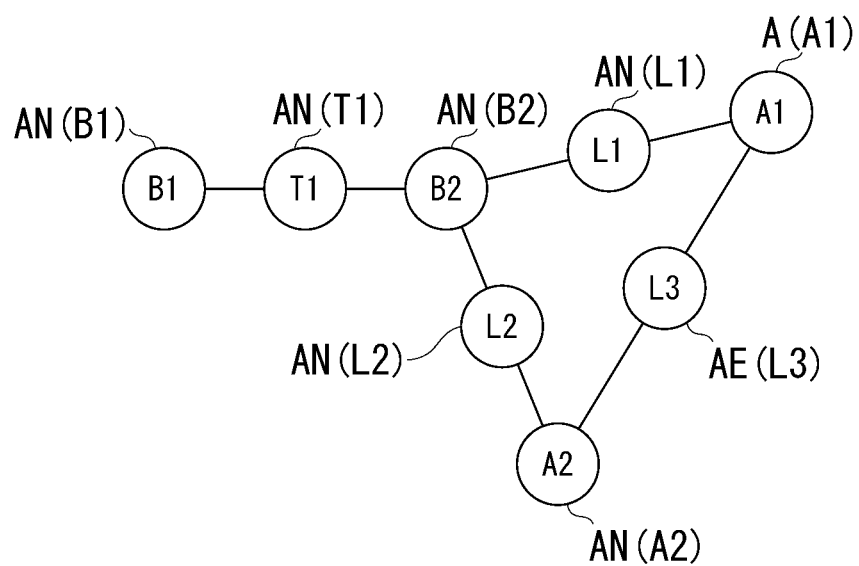

FIG. 5 is a diagram showing an example of the definition of the type of the assumed node AN. In this example, the data processing apparatus of the second embodiment sets two types, A and B, to assumed nodes that were real nodes RN and sets two types, L and T, to assumed nodes that were real edges RE. An upper part of FIG. 5 shows an example of the content of graph-structured data 20 and a lower part of FIG. 5 schematically shows how real nodes RN and real edges RE have been converted into assumed nodes AN.

A real node RN(A) whose type is "A" is a node to which only real edges RE(L) whose type is "L" are connected.

A real node RN(B) whose type is "B" is a node to which both real edges RE(L) whose type is "L" and real edges RE(T) whose type is "T" are connected.

A real edge RE(L) whose type is "L" and a real edge RE(T) whose type is "T" are different from each other in terms of the propagation characteristics of the feature quantity of a real node RN connected thereto.

Numbers following A, B, L, and T are identifiers of the real nodes RN, the real edges RE, and the assumed nodes AN. Hereinafter, symbols such as A1, B1, L1, and T2 are identifiers of the assumed nodes AN that also indicate their feature quantities.

Figure 6:
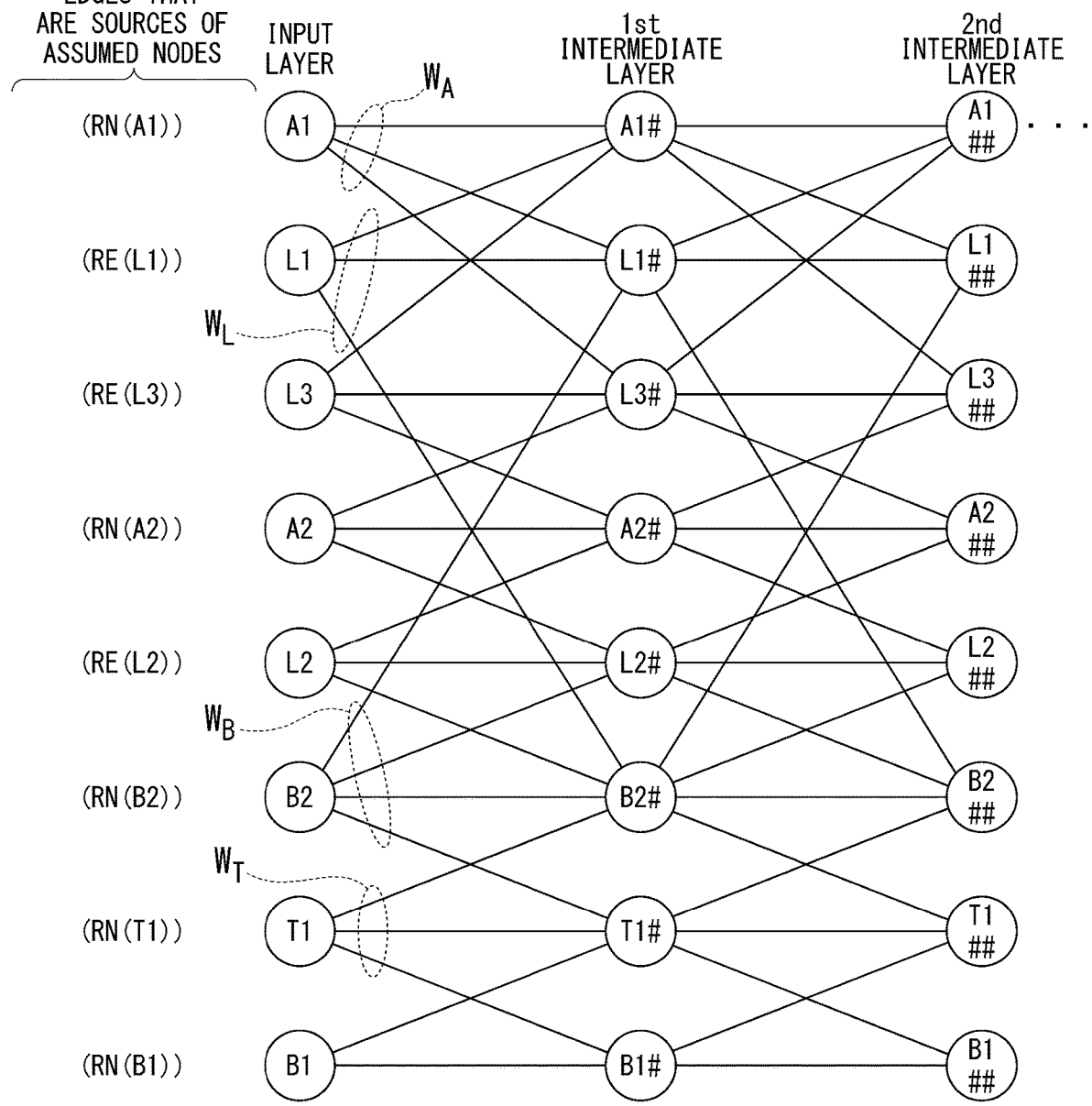
FIG. 6 is a diagram showing a neural network generated from graph-structured data according to a method according to a second embodiment.

FIG. 6 is a diagram showing a neural network generated from the graph-structured data 20 according to a method of the second embodiment. While the rule for generating the neural network is the same as that of the first embodiment, the data processing apparatus of the second embodiment makes a propagation matrix W for determining a coefficient $\alpha_{i,j}$, which defines a feature quantity propagated from an assumed node AN, different for each type of the assumed node AN. Specifically, the data processing apparatus applies a propagation matrix $W_A$ to a feature quantity propagated from an assumed node AN that was the real node RN(A), a propagation matrix $W_B$ to a feature quantity propagated from an assumed node AN that was the real node RN(B), a propagation matrix $W_L$ to a feature quantity propagated from an assumed node AN that was the real edge RE(L), and a propagation matrix $W_L$ to a feature quantity propagated from an assumed node AN that was the real edge RE(T). Each of the propagation matrices $W_A$, $W_B$, $W_L$, and $W_T$ may be made different for each layer.

Thereby, it is possible to more accurately follow differences in the characteristics of real nodes RN or real edges RE and to accurately predict the states (feature quantities) of assumed nodes AN.

Figure 7:
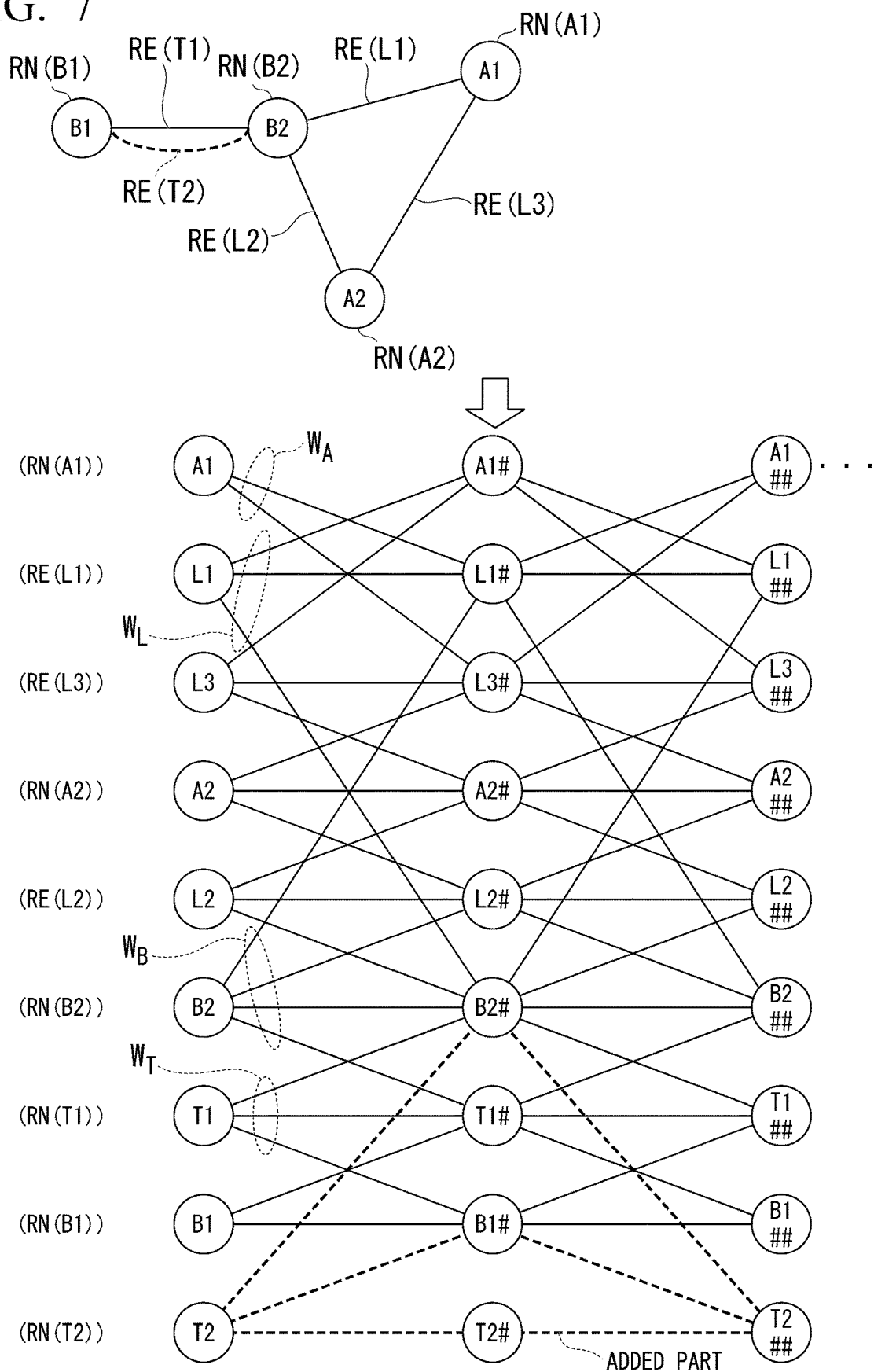
FIG. 7 is a diagram showing how a neural network is changed by changing target data.

According to the data processing apparatus of the first or second embodiment, it is possible to flexibly respond to a change in target data. FIG. 7 is a diagram showing how a neural network is changed by changing target data. In an example of an upper part of FIG. 7, a real edge RE(T2) connecting real nodes RN(B1) and RN(B2) is added as compared with the example of FIG. 5. In this case, it is sufficient to add an assumed node AN(T2) to the neural network and add assumed edges AE that connect the assumed node AN(T2) to the assumed nodes AN(B1) and AN(B2) and the assumed node AN(T2) as shown in the lower part of FIG. 7. Therefore, it is possible to flexibly respond to a change in the target data.

Figure 8:
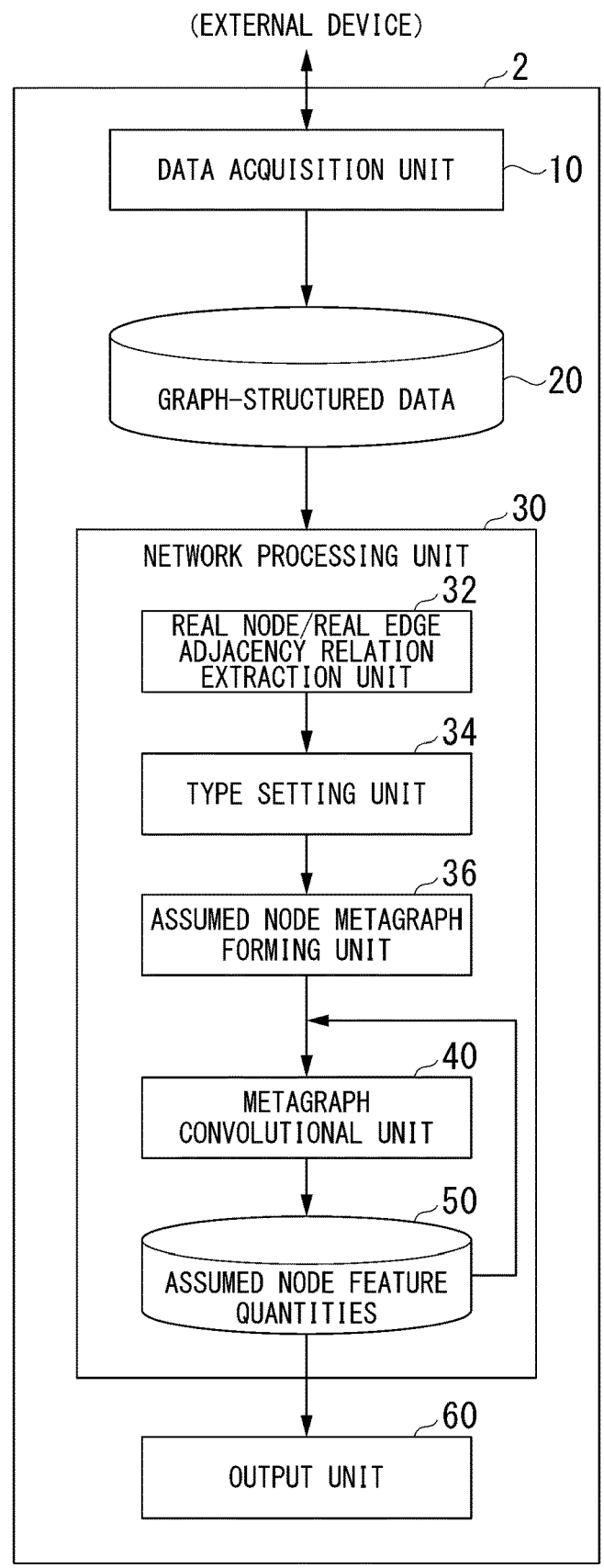
FIG. 8 is a block diagram of a data processing apparatus according to the second embodiment.

FIG. 8 is a block diagram of a data processing apparatus 2 according to the second embodiment. The data processing apparatus 2 further includes, for example, a type setting unit 34 as compared with the first embodiment. The type setting unit 34 is realized, for example, by a hardware processor such as a CPU executing a program (software). Some or all of these components may be realized by hardware (including circuitry) such as an LSI, an ASIC, an FPGA, or a GPU or may be realized by hardware and software in cooperation. The program may be stored in advance in a storage device such as a hard disk drive (HDD) or a flash memory or may be stored in a detachable storage medium such as a DVD or a CD-ROM and then installed in the storage device by mounting the storage medium in a drive device.

The type setting unit 34 refers to the result extracted by the real node/real edge adjacency relation extraction unit 32 to assign types such as those described above to real nodes RN and real edges RE.

The assumed node metagraph forming unit 36 uses the rule based on the graph attention network described above and applies a propagation matrix W according to the type of the propagation source of the feature quantity to determine the coefficient $\alpha_{i,j}$.

The functions of the other components are the same as those of the first embodiment.

According to the second embodiment described above, it is possible to meet a wider range of needs.

The above configuration is suitable for analyzing the states of social infrastructures. For example, an analysis target such as a power transmission and distribution network or a water and sewage network can be analyzed accurately by regarding it as a graph structure.

Figure 9:
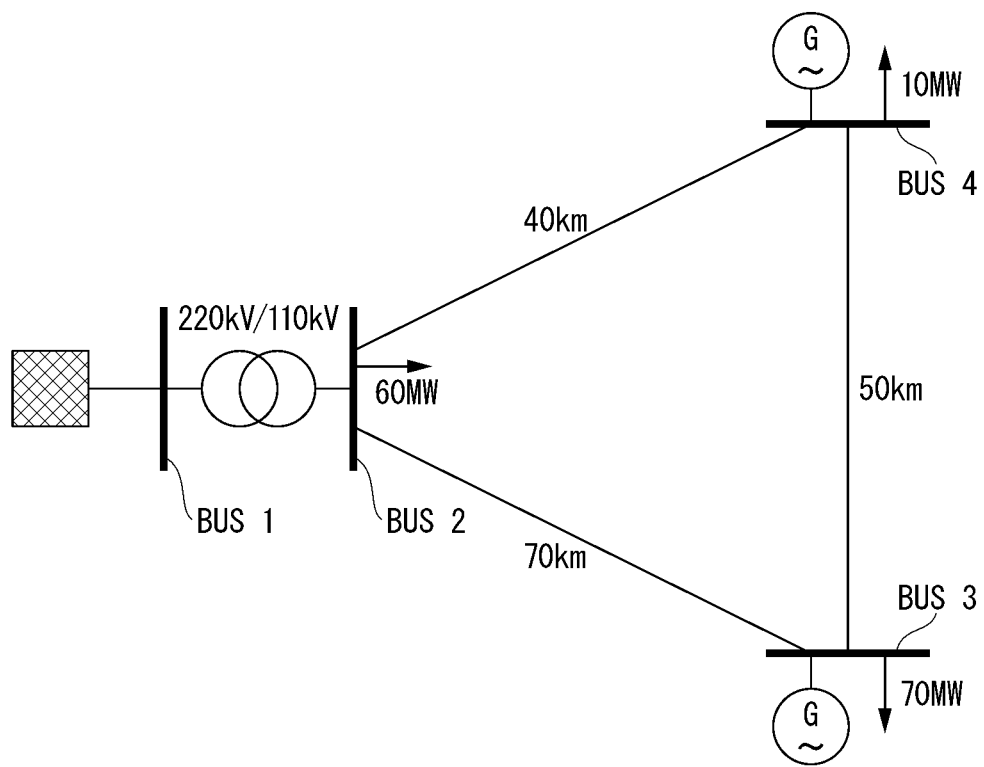
FIG. 9 is a diagram illustrating how the second embodiment is applied to a power transmission and distribution network.

FIG. 9 is a diagram illustrating how the second embodiment is applied to a power transmission and distribution network. The shown configuration includes buses 1 to 4. A bus is a concept like a "point" to which a power supply source or a consumer is connected. A transformer is provided between the bus 1 and the bus 2. A consumer of 60 MW is connected to the bus 2. The bus 2 and the bus 3 are connected by a power line of 70 km. A generator and a 70 MW consumer are connected to the bus 3. The bus 2 and the bus 4 are connected by a power line of 40 km and the bus 3 and the bus 4 are connected by a power line of 50 km. A generator and a consumer of 10 MW are connected to the bus 4. When the buses are considered as real nodes, the transformer is considered as a real edge of type "T," and the power lines are considered as real edges of type "L" in such a configuration, states can be analyzed using the graph-structured data and the neural network shown in FIG. 7. In this case, input attributes that are input to assumed nodes AN based on the real nodes RN include a type, a connected load, and a shunt resistor. Input attributes that are input to an assumed node AN based on the real edge RE of type "T" include a circuit constant and input attributes that are input to an assumed node AN based on the real edge RE of type "L" include a distance and a unit freedom degree. An input attribute is static information in the feature quantity.

When performing analysis processing based on a neural network on a social infrastructure simulated by a graph structure, it is desirable to satisfy the following requirements.

1. Large Scale

Basically, application to a social infrastructure requires a large scale and expandability. For example, when power transmission and distribution networks are considered, some may involve a large-scale circuit network having 10,000 or more buses (connection points such as facility equipment and demand loads).

2. Diversity

Input information using the neural network of the related art is mostly a uniform attribute signal. For example, in the case of image processing, an input is one type of information as a pixel signal or is a feature signal thereof. However, in the case of a social infrastructure, the number of input signals (dimensions) may be several thousands or more and the number of network layers may also be as large as several tens. Considering the power transmission and distribution network described above, the social infrastructure system is a large-scale system in which various types of facilities such as generators, transformers, loads, transformers, and electric wires are connected.

3. Variability

Normally, the operation period of a social infrastructure itself is long, maintenance, improvement, and replacement of equipment are repeated during the operation period, and operation management is reviewed and investment is examined on each such occasion. Thus, there is a demand for a function of following a partial improvement or change of the social infrastructure without retraining the model.

On the other hand, the data processing apparatus according to the embodiment uses the propagation matrix W in common for a plurality of assumed nodes AN, such that it is not necessary to exhaustively search for propagation-related parameters. Therefore, it is possible to curb an increase in processing load even when the analysis target is large-scaled. In addition, it is possible to respond to the demand for diversity by setting types for assumed nodes AN and making propagation matrices W different depending on the types. Further, the connections between nodes in the neural network are not full connections and are limited to those between nodes that are in adjacent relations (connection relations) in original graph-structured data. Therefore, it also possible to respond to the demand for variability.

Modification of First or Second Embodiment

Figure 10:
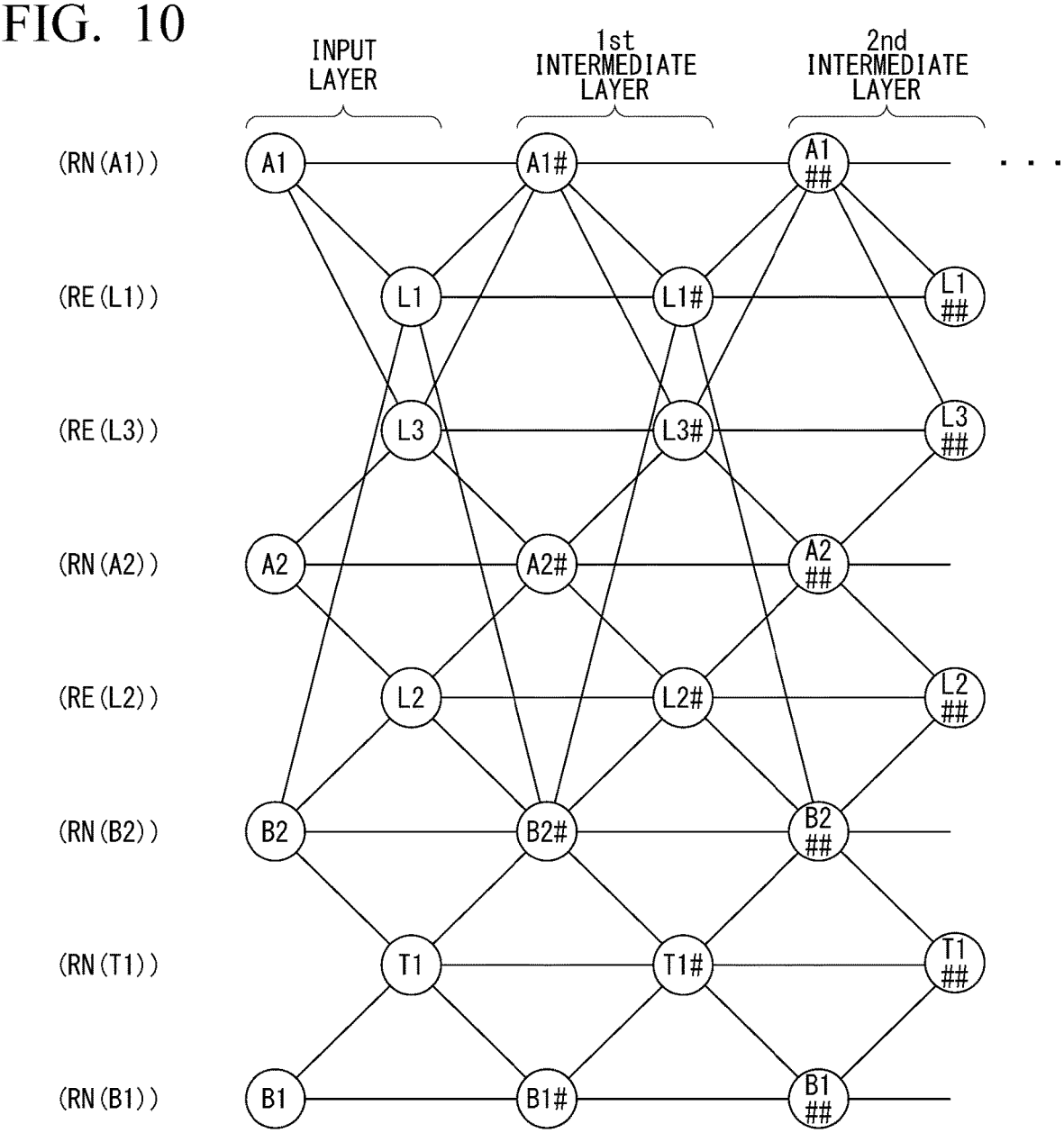
FIG. 10 is a diagram showing an example of a neural network according to a modification.

In each of the above embodiments, after real nodes RN and real edges RE are converted into assumed nodes, processing is performed without distinguishing them on the neural network. However, processing for assumed nodes AN based on real nodes RN and processing for assumed nodes AN based on real edges RE may be alternately performed at shifted times. FIG. 10 is a diagram showing an example of a neural network according to a modification. This configuration allows the state of a real node RN to be more quickly propagated to another real node that is adjacent thereto (connected thereto via one real edge). In this case, information may be propagated from real edges according to a rule different from the rule of the graph attention network.

Third Embodiment

Hereinafter, a third embodiment will be described. In the following embodiments, an action determination network to be learned need only be a network having a graph structure representing the structure of a control target or an analysis target. The graph attention network described in the first or second embodiment is only a preferred example. However, in the following description, it will be assumed that a graph attention network is adopted as an example.

Figure 11:
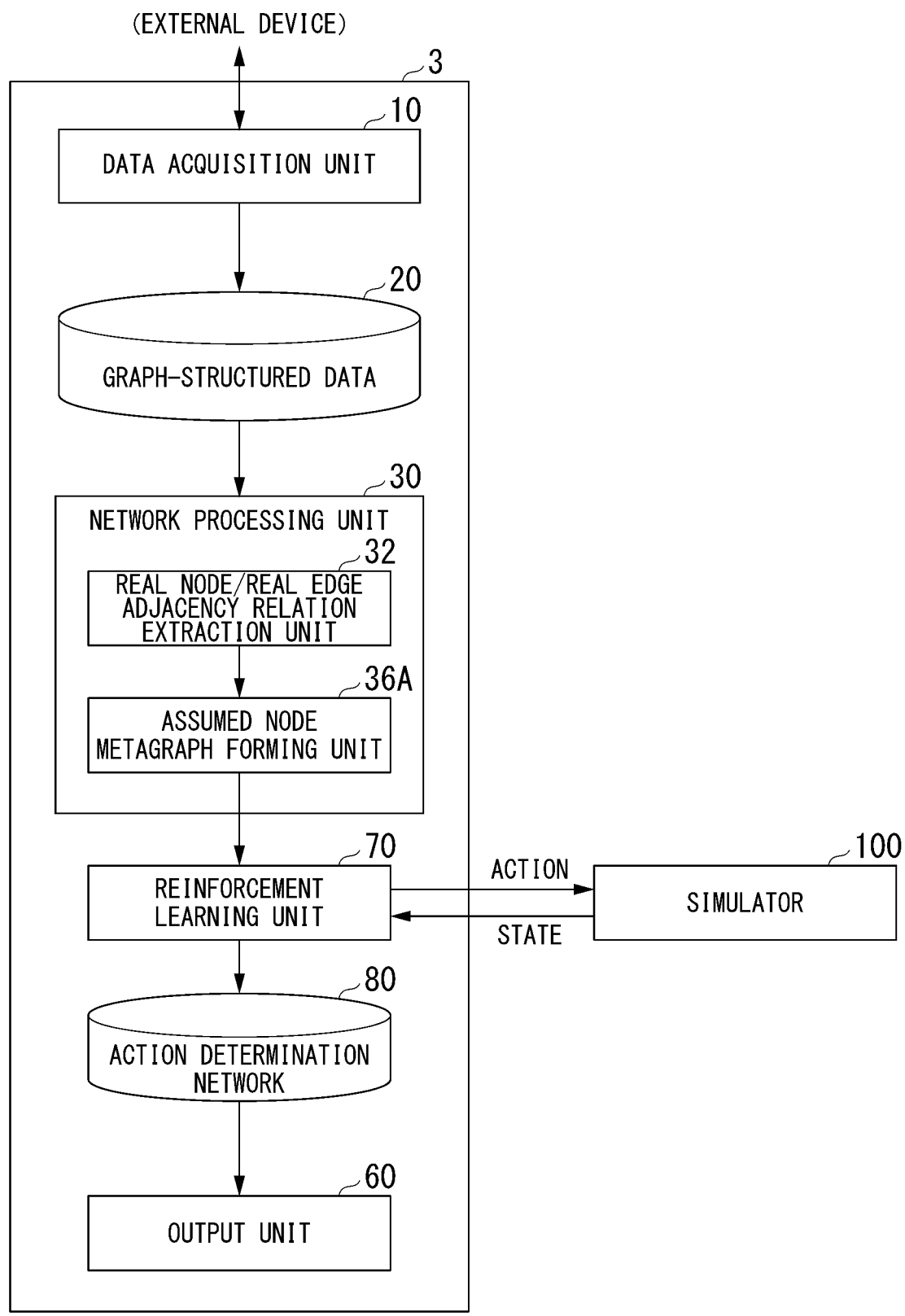
FIG. 11 is a block diagram of a data processing apparatus according to a third embodiment.

FIG. 11 is a block diagram of a data processing apparatus 3 according to the third embodiment. The data processing apparatus 3 includes a data acquisition unit 10, a network processing unit 30, an output unit 60, and a reinforcement learning unit 70. The network processing unit 30 includes a real node/real edge adjacency relation extraction unit 32 and an assumed node metagraph forming unit 36A. The functions of the data acquisition unit 10 and the real node/real edge adjacency relation extraction unit 32 are the same as those in the first or second embodiment and thus the description thereof will not be repeated. In the third and subsequent embodiments, information on an operation node and evaluation target nodes (both of which will be described later) is assigned to graph-structured data and information specifying the operation node and the evaluation target nodes is assigned to real nodes RN and real edges RE and a neural network in which states of the real nodes RN and the real edges RE are connected in a layered manner.

The assumed node metagraph forming unit 36A generates a neural network that connects the states of assumed nodes AN in a layered manner such that real nodes RN and real edges RE extracted by the real node/real edge adjacency relation extraction unit 32 are connected. In the third embodiment, the process of determining the propagation matrix W and the coefficient $\alpha_{i,j}$ in the graph attention network is performed by the reinforcement learning unit 70.

Figure 12:
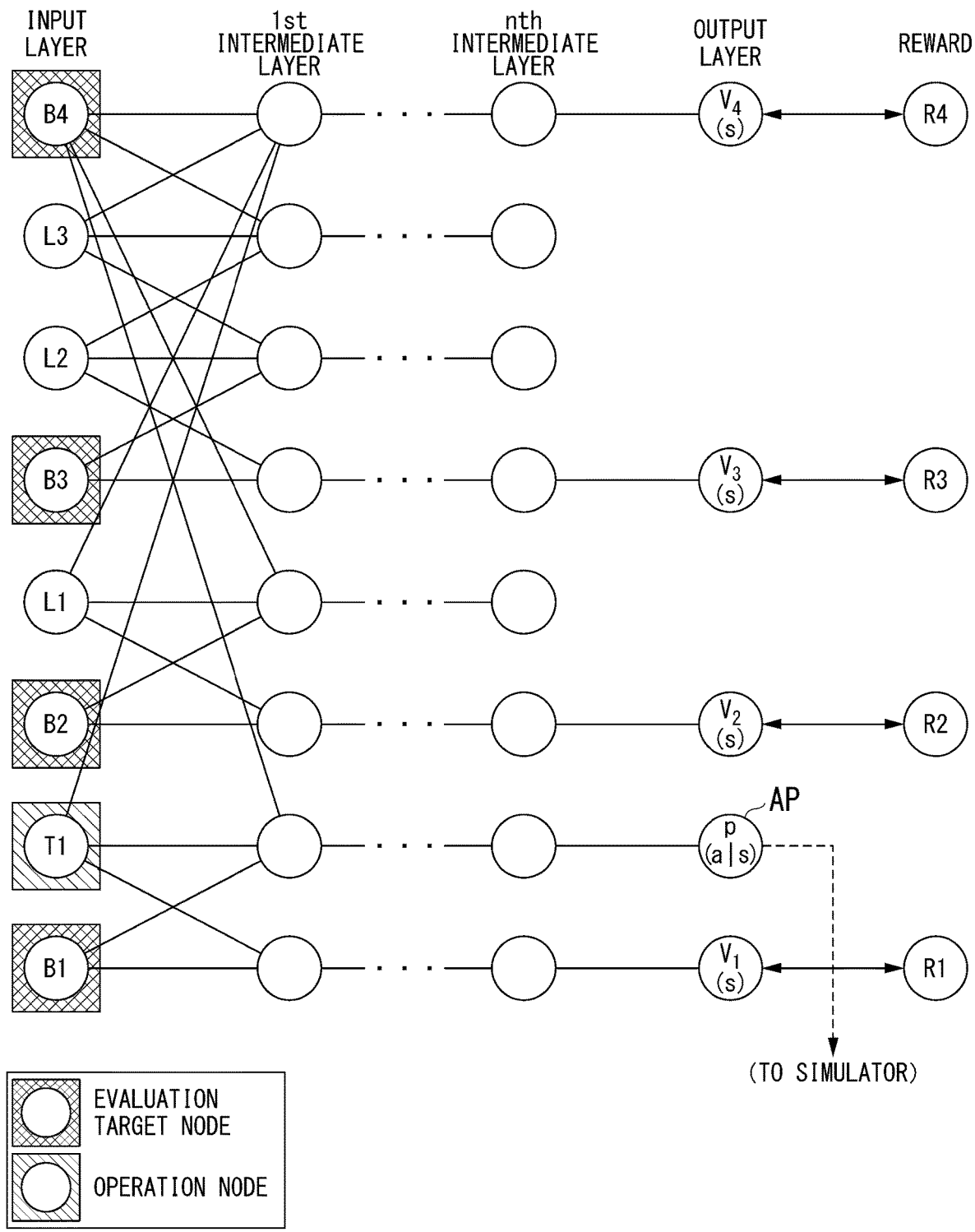
FIG. 12 is a diagram showing an example of a network handled by a reinforcement learning unit according to the third embodiment.

FIG. 12 is a diagram showing an example of a network handled by the reinforcement learning unit 70 according to the third embodiment. As shown, an output layer including a plurality of nodes and an action point are defined in the network generated by the assumed node metagraph forming unit 36A.

The reinforcement learning unit 70 learns parameters of the network (such as the propagation matrix W and the coefficient $\alpha_{i,j}$) such that an output p(als) of the action point that maximizes expected values of rewards R1 to R4 is output. The reinforcement learning unit 70 learns parameters of the network (such as the propagation matrix W and the coefficients $\alpha_{i,j}$) such that square errors between the rewards R1 to R4 and outputs V1(s) to V4(s) are minimized. Argument a indicates an action and s indicates a state. The output p(als) of the action point is, for example, a conditional probability distribution indicating the selection probabilities (likelihoods) of a plurality of options (for example, tap ratios) of an operation node (for example, a tapped transformer) corresponding to the action point under the state s. Information as to which node is an operation node is assigned to the graph-structured data 20 in advance. Each of the rewards R1 to R4 is a value obtained by inputting into a function (reward function) an observation value that is fed back from the simulator 100 as a result of giving the simulator 100 information indicating that an option with the largest selection probability has been selected from the plurality of options.

Assumed nodes in the input layer corresponding to a plurality of nodes in the output layer (hereinafter, evaluation target nodes) are assumed nodes whose states are desired to approach a desired state, that is, assumed nodes having a high importance in control. By defining a plurality of evaluation target nodes, states at a plurality of locations of the control target can be caused to approach desired states and the control target can be controlled more accurately and with a low load. It is also possible to perform control for preferentially causing the state of the most important location to approach a desired state by making the degrees of importance of causing the feature quantities V1(s) to V4(s) of the output layer to approach the rewards R1 to R4 different. For example, the reward function is simply represented by a weighted sum of square errors such as $E[\alpha k \times \{Vq(s)-Rq\}^2]$ (q=1, . . . , 4), and the above preferential control can be performed by bringing the distribution of $\alpha k$ to a desired distribution.

The reinforcement learning unit 70 performs the learning process, for example, on the basis of an A3C algorithm. That is, the reinforcement learning unit 70 optimizes both action selection and a value (V) function called critic, which is determined according to the system's state while comparing and feeding back both the action evaluation function and the value function.

The network whose parameters have been determined by the reinforcement learning unit 70 is output to another device or the like via the output unit 60 as an action determination network 80. Upon receiving this, the other device acquires an optimal action by inputting the state of the control target into the input layer of the action determination network 80. Then, equipment corresponding to the operation node is controlled based on the acquired action.

According to the third embodiment described above, it is possible to learn a network for controlling a control target more accurately and with a lower load. In the reinforcement learning of the related art, only a fully-connected neural network is set and processing such as that of A3C or deep Q-learning is performed. In this case, unnecessary correlations may occur between nodes that are originally less relevant or processing load may increase due to a large number of connections. Further, it is difficult to specify which node should be operated and how to operate the node in order to cause a local state to approach an ideal state since the total number of Q values is one in deep Q learning. In this regard, the data processing apparatus 3 of the third embodiment performs reinforcement learning using a reinforcement learning network representing the graph-structured data 20 describing the connection relations between the nodes and performs learning to cause the plurality of evaluation target nodes to approach rewards and therefore can learn a network for controlling a control target more accurately and with a lower load.

While the above description is an example in which the present invention is applied only to policy-based reinforcement learning in which an action to be taken is output to the output layer, the present invention can also be applied to value-based reinforcement learning. In this case, the reinforcement learning unit 70 exhaustively assumes actions to obtain results and adopts an action maximizing the reward.

Application Example of Third Embodiment and Simulation Result

Figure 13:
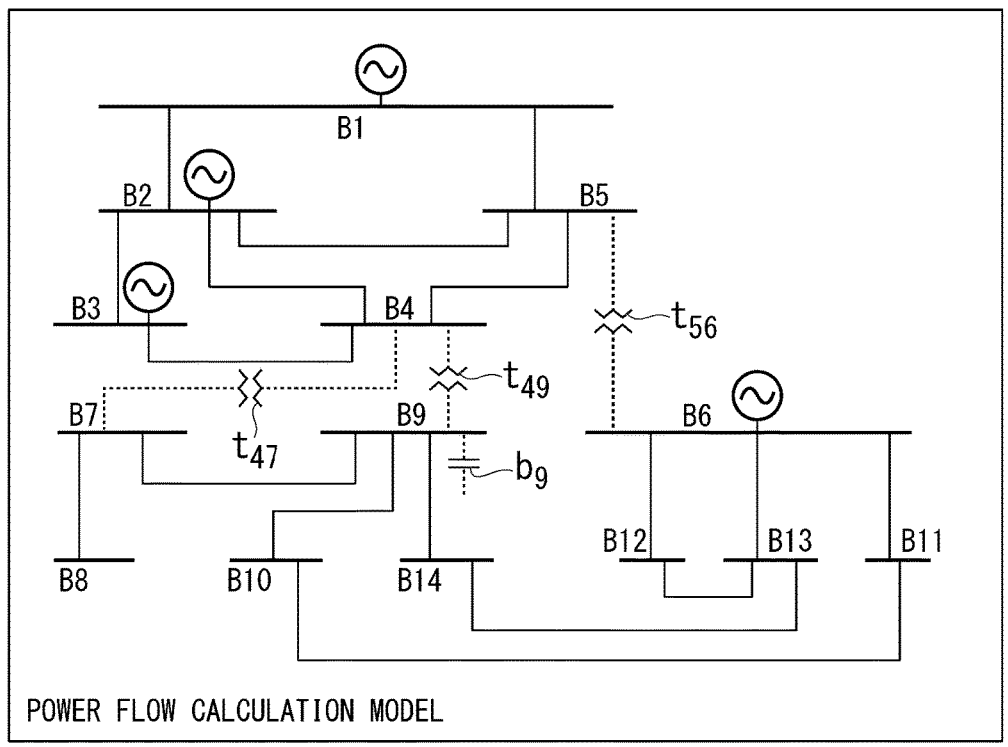
FIG. 13 is a diagram showing a (first) application example of the third embodiment.
Figure 13:
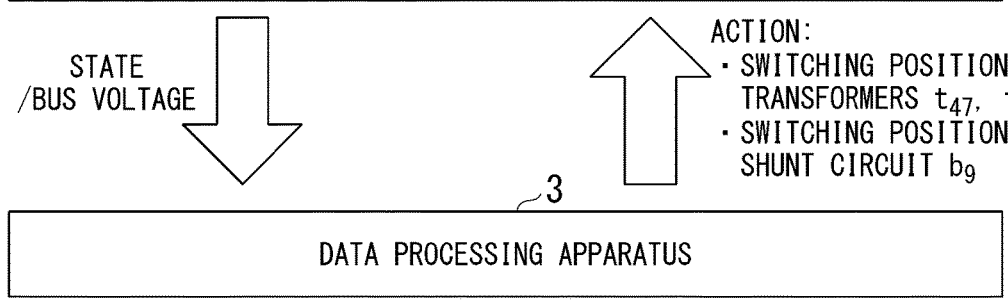

FIG. 13 is a diagram showing a (first) application example of the third embodiment. A power flow calculation model shown in FIG. 13 is an IEEE standard power system model and here includes 14 buses. These are referred to as buses B1 to B14. Loads are connected to the buses. Generators are connected to some buses (buses B1, B2, B3, and B6 in this example), the bus B4 and the bus B7 are connected by a transformer t47, the bus B4 and the bus B9 are connected by a transformer t49, and the bus B5 and the bus B6 are connected by a transformer t56. The other buses are connected by lines (transmission lines). A shunt circuit b9 for controlling the ground flow of power is connected to the bus B9. Here, a system is assumed in which tap changeover switches of the transformers and a changeover switch of the constant of the shunt circuit are controllable as an action space. In this case, the action has four variables (four dimensions).

Figure 14:
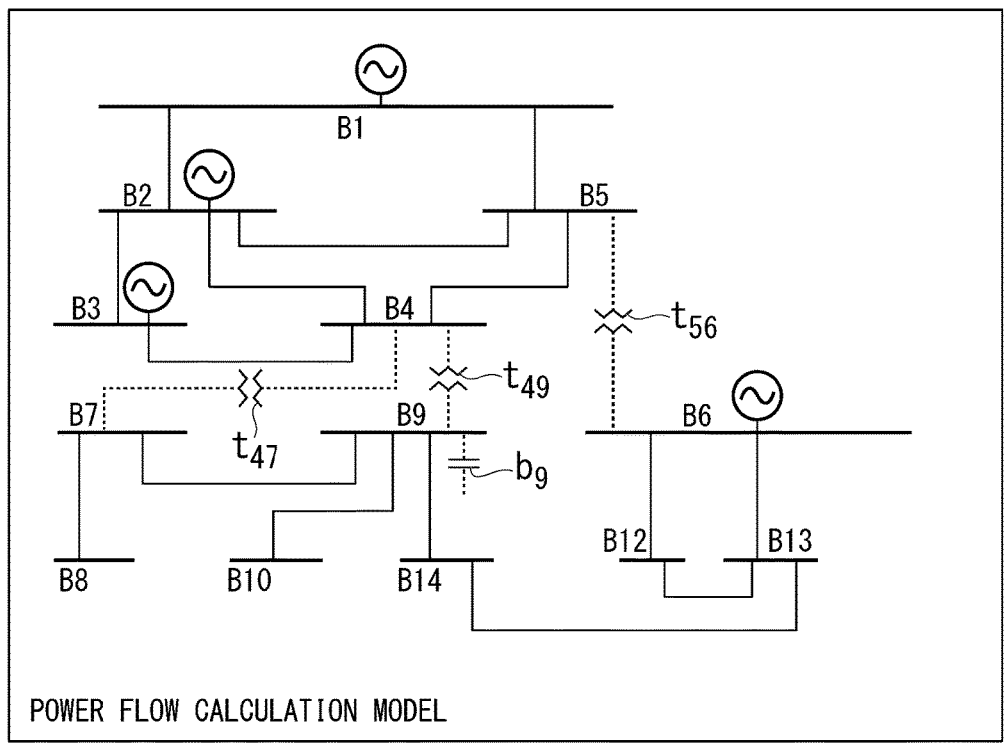
FIG. 14 is a diagram showing a (second) application example of the third embodiment.
Figure 14:
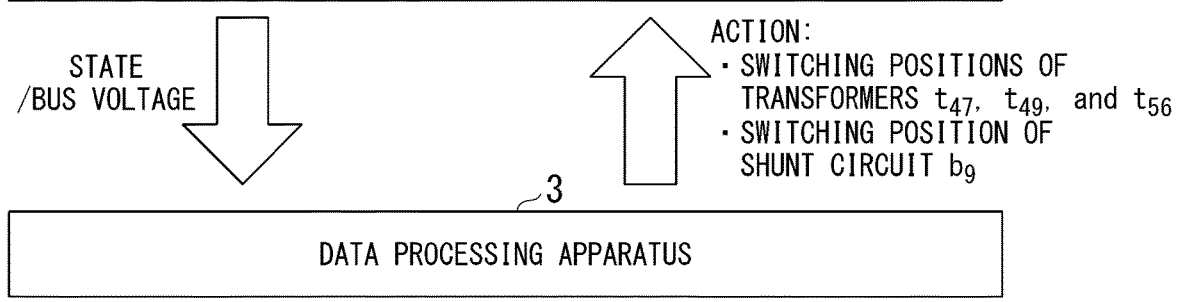

FIG. 14 is a diagram showing a (second) application example of the third embodiment. A power flow calculation model shown in FIG. 14 is obtained by removing the bus B11 from the IEEE standard power system model.

The inventor of the present invention converted the power system shown in FIG. 14 into a metagraph including four types of nodes, a bus, a transformer, a line, and a shunt element, learned a network using the method of the third embodiment, and performed a simulation for controlling the power system (hereinafter referred to as a first simulation). The first simulation was performed by controlling the output voltage switches of the tapped transformers and the shunt circuit while reductions in changes of the voltages of the buses when the loads connected to the buses B4, B5, B6, B7, and B9 has changed are used as rewards, provided that the loads are within a specified range (for example, 0.94 to 1.06 pu) and tap switching is minimized throughout the control period.

The inventor of the present invention also performed a simulation for controlling the power system shown in FIG. 13 (hereinafter referred to as a second simulation) by using the propagation matrices W, the coefficients $\alpha_{i,j}$, and the like (the node functions) corresponding to the bus, transformer, line, and shunt element nodes learned in the power system shown in FIG. 14 as they are.

Figure 15:
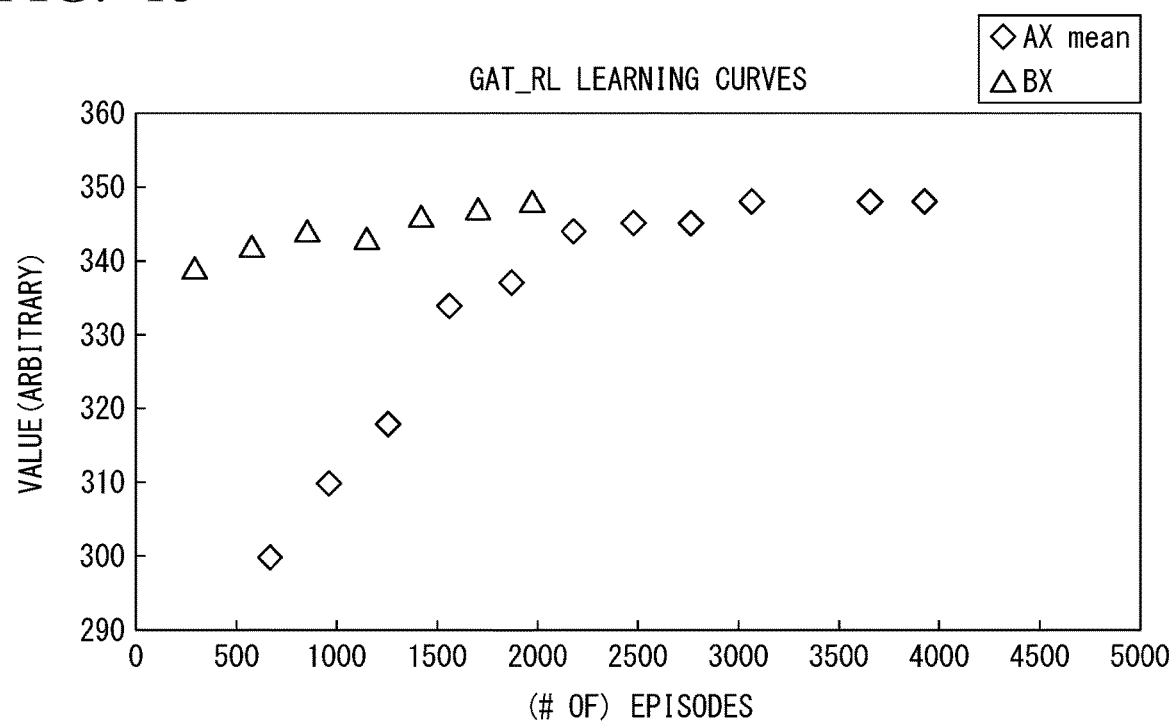
FIG. 15 is a diagram showing voltage control states (that is, value functions) in first and second simulations as learning curves.

FIG. 15 is a diagram showing voltage control states (that is, value functions) in the first and second simulations as learning curves. In FIG. 15, AX indicates a transition of the value function in the first simulation and BX indicates a transition of the value function in the second simulation. As shown, both value functions converge to almost the same value. In other words, it can be seen that substantially equivalent functions can be used as node functions acquired using 13 buses and node functions acquired using 14 buses. Accordingly, each facility model acquired using information of the system that is in operation can be used as a function of an added facility of the same type. Therefore, it can be seen that there is no need to relearn the entire system even when the configuration of the system has changed.

Fourth Embodiment

Hereinafter, a fourth embodiment will be described. In the fourth embodiment, a reward sharing network is further introduced to perform reinforcement learning. Hereinafter, an assumed node metagraph forming unit according to the fourth embodiment is referred to as an assumed node metagraph forming unit 36B and a reinforcement learning unit is referred to as a reinforcement learning unit 70B although a configuration diagram is omitted.

Figure 16:
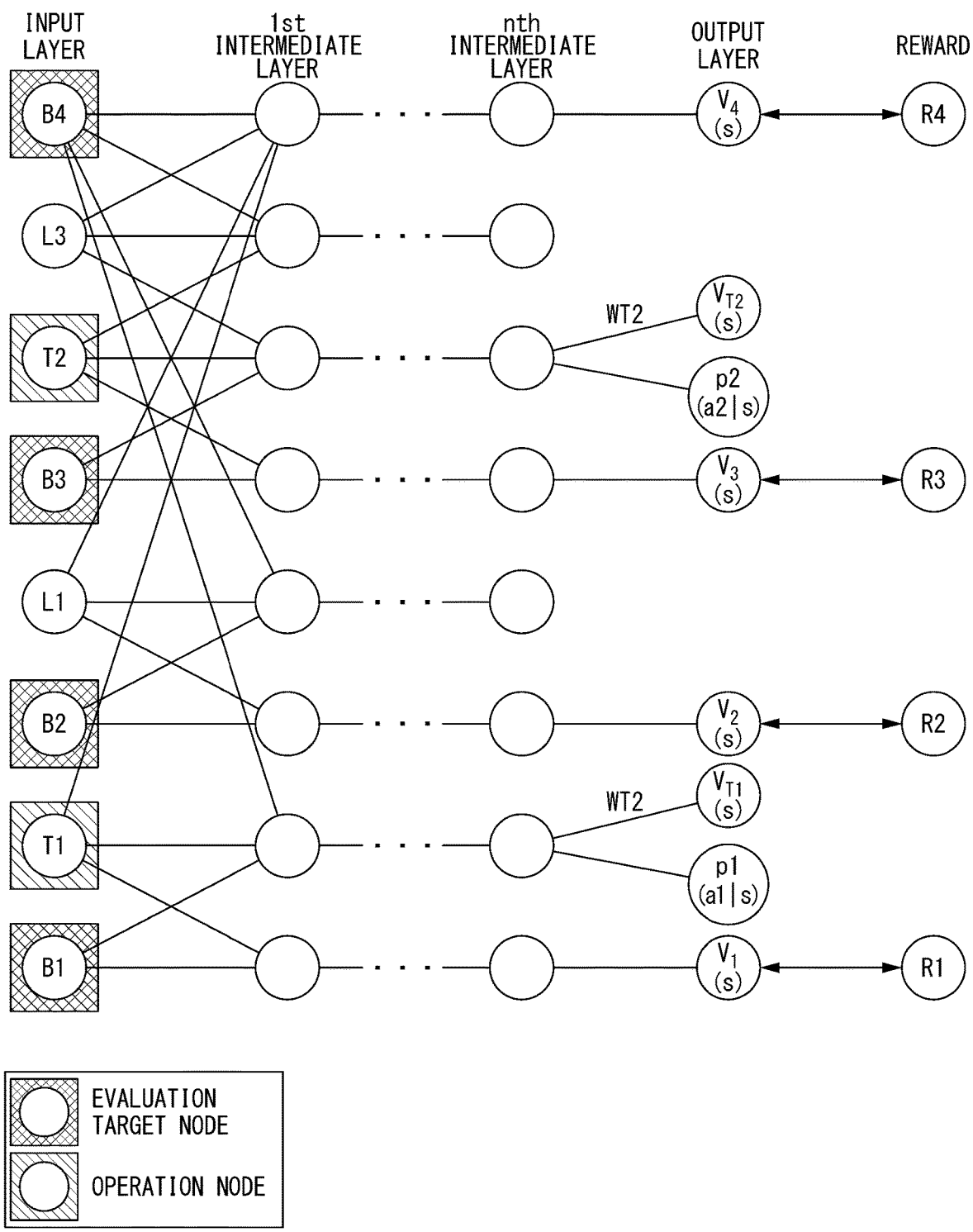
FIG. 16 is a diagram showing an example of a network handled by a reinforcement learning unit according to a fourth embodiment.

FIG. 16 is a diagram showing an example of a network handled by the reinforcement learning unit 70B according to the fourth embodiment. As shown, this network includes a plurality of operation nodes. This network is defined as follows. A selection policy of an action ap at an operation node Tp (p=1, 2) is determined according to a likelihood p(ap|s) for an option {ap} depending on a current state s and is expressed as an evaluation function Vi(s) of an evaluation target node Bi(=1, . . . , 4), where the variable s changes according to the action ap. Each line node is defined as Lq. Hereinafter, the network shown in FIG. 16 is referred to as a reinforcement learning network.

Further, in the fourth embodiment, the assumed node metagraph forming unit 36B defines a reward sharing network, and the reinforcement learning unit 70B connects the reinforcement learning network and the reward sharing network and learns the whole using a reinforcement learning algorithm to simultaneously obtain action policies, node functions, and reward distribution functions of the whole system.

Figure 17:
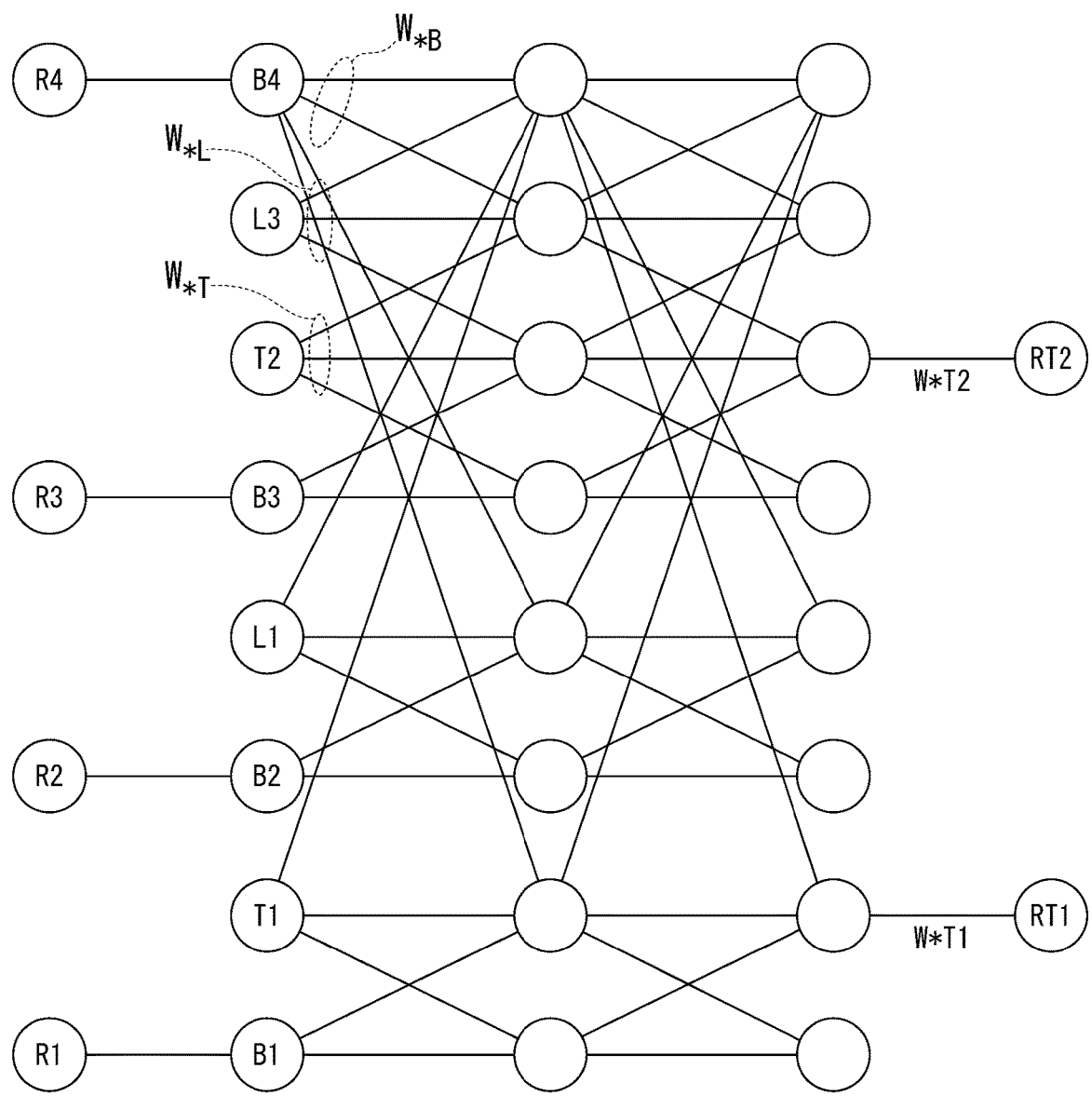
FIG. 17 is a diagram showing an example of a reward sharing network.

FIG. 17 is a diagram showing an example of a reward sharing network. The reward sharing network is a network having the same connection mode as that of at least a part of the reinforcement learning network. Propagation matrices in the reward sharing network are defined as $W^*_B$, $W^*_L$, and $W^*_T$. Hereinafter, it is assumed that "*" indicates that they belong to the reward sharing network. As in the embodiments described above, each of the propagation matrices $W^*_B$, $W^*_L$, and $W^*_T$ may be made different for each layer.

The structure of node attributes in the reward sharing network is as follows. First, a vector nd=(0, 0, . . . , 1, . . . , 0, 0) indicating which node is that among all is defined. The vector nd is a vector in which only one of the elements is 1 and the others are 0. By combining (concatenating) node attributes with a reward function Ri and the vector nd, node attributes including the reward value can be defined as shown in equations (4) to (6).

$$B^*i=(Ri\|ni\|Bi)i=1,\ldots,4 \quad (4)$$

$$T^*p=(0\|np\|Tp)p=1,2 \quad (5)$$

$$L^*q=(0\|nq\|Lq)q=1,2 \quad (6)$$

These node attributes are modeled including the reward value. Therefore, the reinforcement learning unit 70B also obtains a propagation matrix W* and an attention function a* for an input attribute that has been concatenated. The reinforcement learning unit 70B derives propagation matrices W and W* and attention functions a and a* using an A3C or actor-critic algorithm or the like pn on the basis of outputs RT1 and RT2, corresponding estimated values $V_{T1}(s)$ and $V_{T2}(s)$, outputs of the evaluation target nodes Bi, and estimated values V1, V2, V3, and V4 corresponding to R1, R2, R3, and R4. These are obtained for each node type γ={B, T, L}.

When a parameter set (W*, a*) has been derived, an attention coefficient $e^k_{ij}$ from a node j adjacent to a node i of type k to the node i is expressed by equation (7). In the equation, a(,) is an attention function and its output is a real value. This may also be a linear function (inner product) of two vector inputs.

$$e^k_{ij}=a(W^*k\cdot h^*j, W^*k\cdot h^*i) \quad (7)$$

$a^k_{ij}$ is obtained by normalizing equation (7) as shown in equation (8). The sum of $a^k_{ij}$ for a set of nodes j adjacent to node i is 1. $e^k_{ij}$ which is the attention coefficient may also be multiplied by a nonlinear function such as LeakyReLU.

$$a^k_{ij}=\text{softmax}\_j(e^k_{ij}) \quad (8)$$

When the attributes of nodes of the next layer are defined as h*' d, equation (9) holds.

$$h^*'i=\sigma\{\Sigma_{j\in Ni}(a^k_{ij}\cdot W\cdot h'i)\} \quad (9)$$

h*d describes the node attribute of the reward sharing network where a reward, node identification information and a node attribute are concatenated. That is, h*d is represented by equation (10).

$$h^*d=(R\|n\|hd)d=1,2,\ldots,8 \quad (10)$$

Here, a difference function (advantage function) between the estimated evaluation value $V_i(s)$ of the evaluation target node Bi and the actual reward value Ri is defined as in equation (11).

$$Ai(t)=Ri(t)-V_i(s)i=1,\ldots,4 \quad (11)$$

From this advantage function, loss functions represented by equations (12) and (13) are defined.

$$Lpi=\log\{p(a|s)-Ai(t)\} \quad (12)$$

$$Lvi=Ai(t)^2 \quad (13)$$

The reinforcement learning unit 70B updates W and a along the gradients of the loss functions. In this case, for example, by obtaining a weighted sum for all evaluation target nodes, an advantage may be defined as an attribute for the entire system and calculated as in the above equation. The reward Ri(t), the attribute hd(t) of each node, and the identification vector nd of the node calculated in each update process are concatenated to configure an input node h*d of the reward sharing network as shown in equation (10). Such configured input nodes are inputs of the reward sharing network. Outputs of the reward sharing network are reward values RTp virtually defined for nodes (control nodes) corresponding to the operation nodes. Based on this reward function, an estimated evaluation value VTp(s) of each control node is obtained through a learning process. The advantage function and the loss functions for the control node are defined as in equations (14) to (16).

$$ATp(t) = RTp(t) - V_{Tp}(s) \quad p=1,2 \tag{14}$$

$$Lpp = \log\{p(a|s) \cdot ATp(t)\} \tag{15}$$

$$Lvp = Ap(t)^2 \tag{16}$$

The reinforcement learning unit 70B derives a node function and a reward distribution function simultaneously by updating W* and a* along the gradients of the loss functions. Here, each estimated value V(s) is obtained by estimating the current value function using learning coefficients that are those of several steps ahead in the reinforcement learning process. Here, the number of steps to read ahead may be appropriately selected.

Hereinafter, a process of obtaining a reward distribution formula on the basis of the reward distribution function acquired in the reinforcement learning process will be described. In FIG. 16, in the output layer of the reinforcement learning network, an estimated reward function $V_{T1}(s)$ and $V_{T2}(s)$ is output at each output node corresponding to the operation node T1 and T2 via a coefficient parameter set WT1 and WT2. On the other hand, in FIG. 17, in the output layer of the reward sharing network, a (real) reward function RT1(t) and RT2(t) is output at each output node (control node) corresponding to the operation node T1 and T2 redefined through concatenation via a coefficient parameter set W*T1 and W*T2. Let I be a set of reward nodes and K be a set of operation nodes. Also, let h→ be defined as a characteristic expression of the nodes of the entire system as in equation (17).

$$h^* \rightarrow = (h^*1, h^*2, \ldots, h^*8) \tag{17}$$

Then, letting f(h*→) be the reward distribution function, it is assumed that an output vector r*=f(h*→) has been obtained. A component for the operation node k(∈K) is extracted from the output vector r* and set as {r*k}, such that a distribution coefficient αk can be obtained based on equation (18).

$$\alpha k = \mathrm{softmax}(W^*Tk, r^*k) = \exp(W^*Tk)/\Sigma_{j \in K} \exp(WTj \cdot ij) \tag{18}$$

The reinforcement learning unit 70B distributes the reward Ri obtained at the reward node i(∈I) as a part of the reward of the element k of the operation control node set K using the coefficient αk. Actual distribution calculation is represented by equation (19).

$$Rki = \alpha k \cdot Ri \tag{19}$$

The reinforcement learning unit 70B calculates the reward Rk finally given to the operation node k by summing Rki for all reward nodes as shown in equation (20).

$$Rk = \Sigma_{j \in I} RiK$$

Based on this Rk and the evaluation function Vk(s) (k∈K) on the reinforcement learning network side, the reinforcement learning unit 70B defines an advantage as Ak=Rk−Vk(s) and obtains the distribution functions and coefficients of the network using an algorithm similar to A3C or the like.

According to the fourth embodiment described above, it is possible to achieve the same advantages as those of the third embodiment and further to analyze which operation node has contributed to causing the feature quantities to approach the rewards.

Fifth Embodiment

Figure 18:
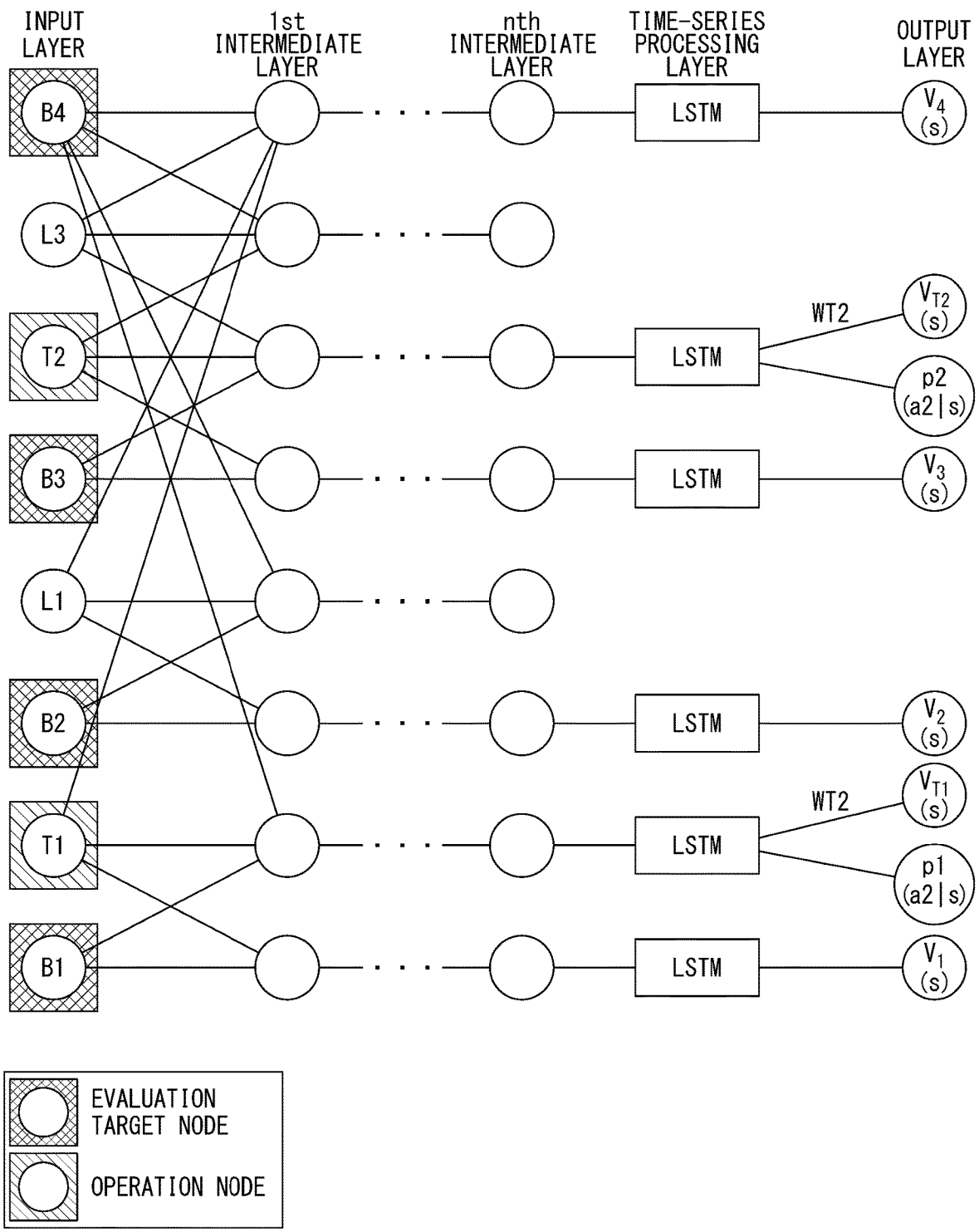
FIG. 18 is a diagram showing a state in which an LSTM is applied to the reinforcement learning network shown in FIG. 16.

A fifth embodiment will now be described. In the fifth embodiment, a time series processing layer such as a long short term memory (LSTM) is added between an intermediate layer and the output layer of the reinforcement learning network according to the third or fourth embodiment. FIG. 18 is a diagram showing a state in which an LSTM is applied to the reinforcement learning network shown in FIG. 16. The same LSTM may be used for each node type. Addition of the time series processing layer enables learning in consideration of a state transition of each node.

Sixth Embodiment

Hereinafter, a sixth embodiment will be described. The sixth embodiment includes a reward distribution unit in addition to the components of any one of the third to fifth embodiments. Hereinafter, an example in which a reward distribution unit is added to the third embodiment will be described.

Background of Sixth Embodiment

In recent years, attempts have been made to utilize artificial intelligence in industrial fields. There are many artificial intelligence technologies which are mainly deep learning and related technologies and their application range is expanding to image recognition, failure analysis, characteristic prediction, and the like. In addition, applications of reinforcement learning are expanding to consider optimal time-series operation of such targets. In infrastructure-related fields such as traffic, power systems, and computer networks, targets often have a graph structure. When reinforcement learning is applied to a target having a graph structure, an action or reward may be given in association with each node. For example, consider a problem of construction schedules that minimize congestion in a traffic network. In this case, an action is associated with a road node to be constructed and the degree of congestion, which is a reward, is calculated for each road node. In this case, it is assumed that a certain neighborhood relation holds between the action and the reward. In the above example, when construction has been performed on a road, this has a great influence on the degree of congestion on a nearby road and is considered to have a small influence on a distant road. Hereinafter, nodes at which a reward is calculated are called reward nodes and nodes at which an action is performed are called operation nodes. These are defined as a subset of nodes included in the structure of a target graph and are not exclusive.

There has been no technology that properly considers such a neighborhood relation of rewards. Therefore, it is conceivable that a reward obtained at each node is equally distributed to each action, ignoring the neighborhood relation. However, in this case, the following two problems are conceivable.

(1) Factor Interpretation

It is considered that there are neighborhood relations between operation nodes and reward nodes. Ignoring this means that, for each reward, a node whose action has generated the reward is not taken into consideration. This makes factor analysis difficult.

(2) Scalability

A reward obtained from a node having low relevance with an operation node is equivalent to inclusion of noise in the reward for the operation node and thus lowers the convergence of the model. As the size of the control target increases and the number of operation nodes and reward nodes increases, the relevance therebetween becomes unclear and rewards from reward nodes having low correlation flow into each operation node and the learning speed of the model is supposed to decrease.

Figure 19:
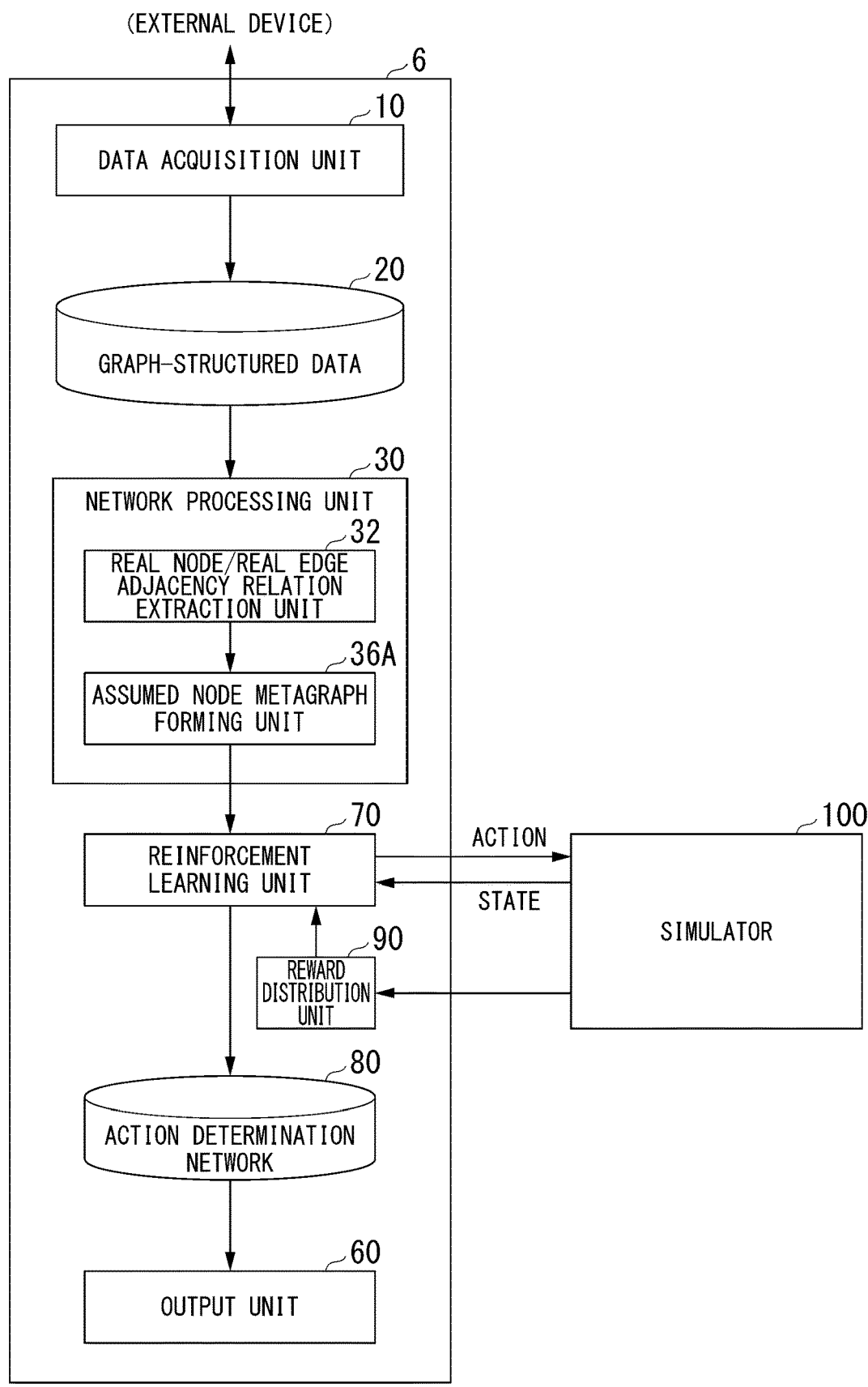
FIG. 19 is a block diagram of a data processing apparatus according to a sixth embodiment.

FIG. 19 is a block diagram of a data processing apparatus 6 according to the sixth embodiment. The data processing apparatus 6 includes a reward distribution unit 90 in addition to the components of the data processing apparatus 3 shown in FIG. 11. The reward distribution unit 90 may be configured as a device (reward distribution device) independent of the data processing apparatus 6.

The reward distribution unit 90 determines a reward distribution matrix D. The reward distribution matrix D is a matrix having the same number of elements as "the number of distribution target nodes×the number of distribution source nodes." The number of distribution target nodes is equal to the number of operation nodes at time t and the number of distribution source nodes is equal to the sum of the number of reward nodes at time t+1 and the number of operation nodes at time t+1. A first dimension index of the reward distribution matrix D corresponds to an operation node at time t and a second dimension index of the reward distribution matrix D corresponds to a reward node or operation node at time t+1. An element $d_{ij}$ of the reward distribution matrix D indicates a reward distribution ratio from a jth reward node or operation node at time t+1 to an ith operation node at time t. The element $d_{ij}$ of the reward distribution matrix D is calculated by a function that receives a neighborhood relation having a graph feature or a graph structure as an input and has a number of parameters independent of the graph structure. For example, a normalized arrival distance or a normalized arrival probability of a random walk on a graph, a GCN for reward propagation, or the like may be used. For these, symmetry need not be considered and a general definition of distance need not, but may, be followed.

Elements of the reward distribution matrix D are normalized such that they sum to 1 when added in the first dimension index direction as shown in equation (20). This is to prevent the total amount of reward from being changed upon reward distribution that will be described later. As a normalization method, a softmax function may be applied or a method such as division by the sum of elements may be considered. Hereinafter, parameters of the function for calculating the elements $d_{ij}$ of the reward distribution matrix D and normalization parameters are collectively represented as φ and the reward distribution matrix determined by φ is represented as Dφ. Also, when there are a number of reward types, the reward distribution matrix D may be defined for each reward type.

$$\Sigma_i d_{ij} = 1 \ \forall j \in \text{node index} \quad (20)$$

The reward distribution unit 90 determines rewards to be distributed to operation nodes on the basis of the reward distribution matrix Dφ and a combined reward vector $R'_{t+1}$. More specifically, the reward distribution unit 90 determines rewards to be distributed to operation nodes at time t on the basis of equations (21) and (22). In the equations, "concat" indicates concatenation (combination), $r_{t+1}$ indicates a reward set calculated for reward nodes at time t+1 and expressed as a vector arranged along the indices of the nodes, $R_{t+1}$ indicates a vector expressing rewards propagated back from the future, and γ indicates a discount rate of the future reward. The reward distribution unit 90 derives a current reward vector $R_t$ by multiplying the reward distribution matrix Dφ by the combined reward vector $R'_{t+1}$. The reward vector $R_t$ is a vector having the same length as the number of operation nodes at time t and the reward distribution unit 90 distributes rewards to the operation nodes at time t on the basis of the reward vector $R_t$.

$$R'_{t+1} = \text{concat}(r_{t+1}, \gamma \cdot R_{t+1}) \quad (21)$$

$$R_t = D\phi \cdot R'_{t+1} \quad (22)$$

The parameter φ of the reward distribution matrix Dφ can be manually given as a hyperparameter or can be automatically obtained through learning. It is preferable to select an objective function for learning that maximizes the degree of relevance between the reward vector expression $R_t$ calculated by Dφ and the state s_tn and action a_tn of each operation node. For example, an information gain due to an action calculated by comparing a reward distribution before the action is performed and a reward distribution after the action is performed for each node, an information gain of an action probability obtained by observing a reward, or the like can be used. The automatic learning will be described later.

Application Example

Figure 20:
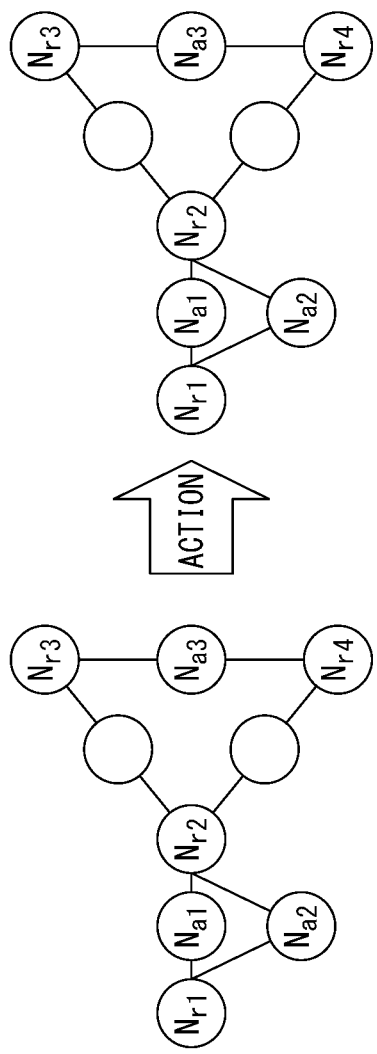
FIG. 20 is a diagram showing an example of how a future reward vector $R_{t+1}$ is derived.

Hereinafter, an application example of the sixth embodiment will be described. FIG. 20 is a diagram showing an example of how the future reward vector $R_{t+1}$ is derived. FIG. 20 shows a state in which a transition has been made to time t+1 as each of the operation nodes $N_{a1}$ to $N_{a3}$ takes an action represented by an action vector A_t ((0, 1, 1) in FIG. 20) at time t and rewards obtained accordingly. Reward nodes $N_{r1}$ to $N_{r4}$ and operation nodes $N_{a1}$ to $N_{a3}$ are defined on a graph. The reward nodes are given a reward vector $rt_{t+1}$, the operation nodes are given a reward vector $Rt_{t+1}$ that the operation nodes can obtain in the future. The reward distribution unit 90 distributes the rewards to the operation nodes.

Figure 21:
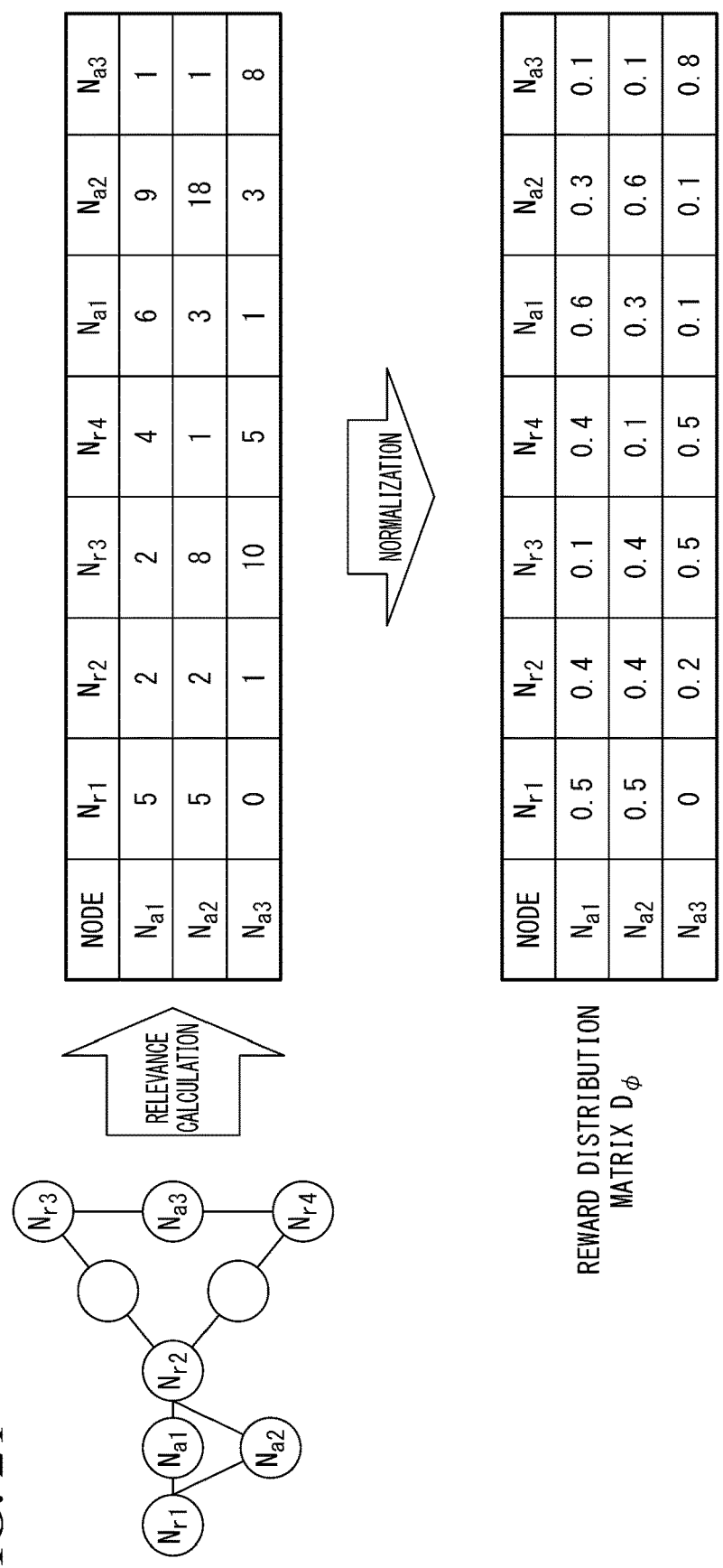
FIG. 21 is a diagram showing an example of how a reward distribution matrix $D\phi$ is generated.

First, the reward distribution unit 90 generates a reward distribution matrix Dφ. FIG. 21 is a diagram showing an example of how a reward distribution matrix Dφ is generated. The reward distribution unit 90 calculates relevance scores between operation nodes $N_{a1}$ to $N_{a3}$ at time t and reward nodes $N_{r1}$ to $N_{r4}$ and operation nodes $N_{a1}$ to $N_{a3}$ at time t+1 using an arbitrary function and normalizes the association scores such that they sum to 1 in the operation node direction, thereby generating a reward distribution matrix Dφ.

Then, the reward distribution unit 90 derives a reward vector $R_t$. FIG. 22 is a diagram showing an example of how the reward vector $R_t$ is derived. The reward distribution unit 90 multiplies the reward distribution matrix Dφ from the right by a combined reward vector $R'_{t+1}$ obtained by combining the reward vector $r_{t+1}$ and $\gamma \cdot R_{t+1}$ obtained by multiplying the future reward vector by the discount rate γ. For the sake of simplicity, the discount rate γ is set to 1 in FIG. 22. As a result, a reward vector $R_t$ to be given to the operation nodes is calculated. The reinforcement learning unit 70 performs arbitrary reinforcement learning for each operation node using this reward vector $R_t$. For example, in the case of the advantage-actor-critic method, the parameter θ of the policy π of each operation node is updated according to equation (22). Even if the graph structure has changed in an episode, the parameter θ can be evaluated by recalculating the reward distribution matrix. In the example of FIG. 22, it can be seen that, for example, the element of $N_{r3}$ of the reward vector has been generated by being affected by the operation node $N_{a3}$.

$$\Delta\mu(\theta) = \Sigma n(R_m - V_n(st)) \log \pi\theta(a_n|s_t) n \in Na \quad (22)$$

Hereinafter, automatic learning of the parameter $\phi$ of the reward distribution matrix $D\phi$ will be described. An ideal parameter of the reward distribution matrix is a parameter at which the distribution of rewards R_tn distributed to an operation node n at time t is greatly affected by an action of the node, that is, at which the sum Ig of information gains of the reward distribution due to the action is considered to be maximized. The sum Ig is represented by equation (23). In the equation, KL is a KL divergence (a KL information amount).

$$Ig = \Sigma t \Sigma n [KL(P(R_m|s_t, a_m) \| P(R_m|s_t)) n \in \text{anode} \quad (23)$$

Assuming that the distribution of rewards follows a normal distribution with a variance of $\sigma^2$, a part of equation (23) can be expressed by equation (24). In this equation, N is a function representing a normal distribution.

$$P(R_m|s_t, a_m) = N(\mu_n(s_t), \sigma) \quad (24)$$

By substituting equation (24) into equation (23), equation (23) can be transformed into equation (25) using a KL divergence between normal distributions. Since $\mu_n(s)$ is an expected value of the reward that does not depend on the action of each operation node, $\mu_n(s)$ can be replaced with a state value $V_n(s)$ estimated by the reinforcement learning model. $(D\phi \cdot R'_{t+1})_n$ is an element corresponding to the nth index of the vector $(D\phi \cdot R'_{t+1})$.

$$Ig = \sum_t \sum_{n \in \text{anode}} \log \frac{\sigma}{\sigma} + \frac{\sigma^2 + (\mu_n(s_t, a) - \mu_n(s_t))^2}{2\sigma^2} - \frac{1}{2}$$
$$= \sum_t \sum_{n \in \text{anode}} \frac{\sigma^2 + (E[(D_\varphi R'_{t+1})_n] - V_n(s_t))^2}{2\sigma^2} - \frac{1}{2} \quad (25)$$

If this is partially differentiated by the parameter $\phi$ of the reward distribution matrix $D\phi$, the gradient can be expressed by $\partial D\phi/\partial\phi$. If $D\phi$ is defined in a form that can be differentiated by the parameter $\phi$, the gradient with respect to the parameter $\phi$ can be obtained using equation (26) and the parameter $\phi$ can be optimized using a stochastic gradient descent method or the like. The reward distribution unit 90 optimizes the parameter $\phi$ on the basis of the principle described above.

$$\frac{\partial Ig}{\partial \varphi} = \frac{\partial}{\partial \varphi} \sum_t \sum_{n \in \text{anode}} \frac{\sigma^2 + (E[(D_\varphi R'_{t+1})_n] - V_n(s_t))^2}{2\sigma^2} - \frac{1}{2} p$$
$$= \sum_t \sum_{n \in \text{anode}} \frac{\partial D_\varphi}{\partial \varphi} \frac{E[(D_\varphi R'_{t+1})_n] - V_n(s_t)}{\sigma^2} \quad (26)$$

Modification of Sixth Embodiment

Hereinafter, a modification of the sixth embodiment will be described. The sixth embodiment is applied to a multi-agent system in which a plurality of agents act at the same time. However, in this modification, it is assumed that the number of operation nodes acting at the same time is one.

Figure 23:
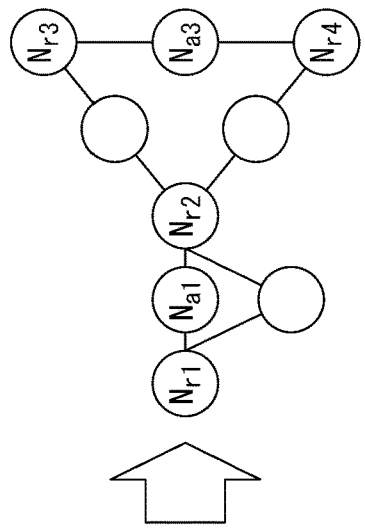
FIG. 23 is a diagram showing an example of a state change of a node to be processed according to a modification of the sixth embodiment.
Figure 23:
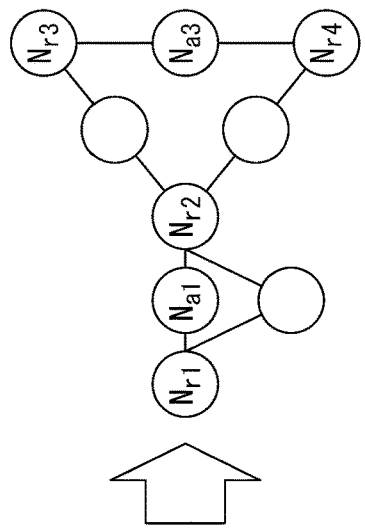
Figure 23:
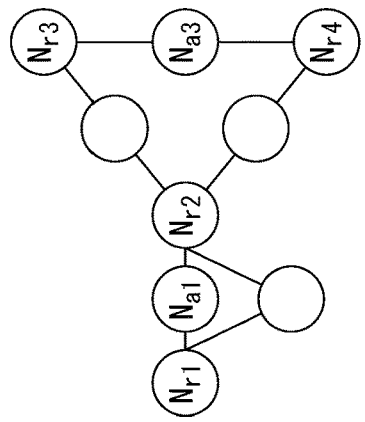

FIG. 23 is a diagram showing an example of a state change of a node to be processed according to the modification of the sixth embodiment. As shown in FIG. 23, consider a reward vector $r_{t+2}$ generated at time t+2 and a problem of distributing future rewards $R_{t+2}$ obtained from the reward vector $r_{t+2}$ to times t+1 and t. Here, it is assumed that rewards distributed at each time are scalar. It is assumed that a future reward $R_{t+2}$ has been generated at a node $N_{all}^{t+2}$ which is equidistant from all nodes at the same time.

A reward distribution unit of the modification (referred to as a reward distribution unit 90A although not shown) connects corresponding nodes of times t to t+2 with edges in the time axis direction to create a connection graph. The reward distribution unit 90A sets an index of time other than that of location for each of the reward nodes and the operation nodes and calculates elements of the reward distribution matrix $D\phi$ on this connection graph.

Figure 24:
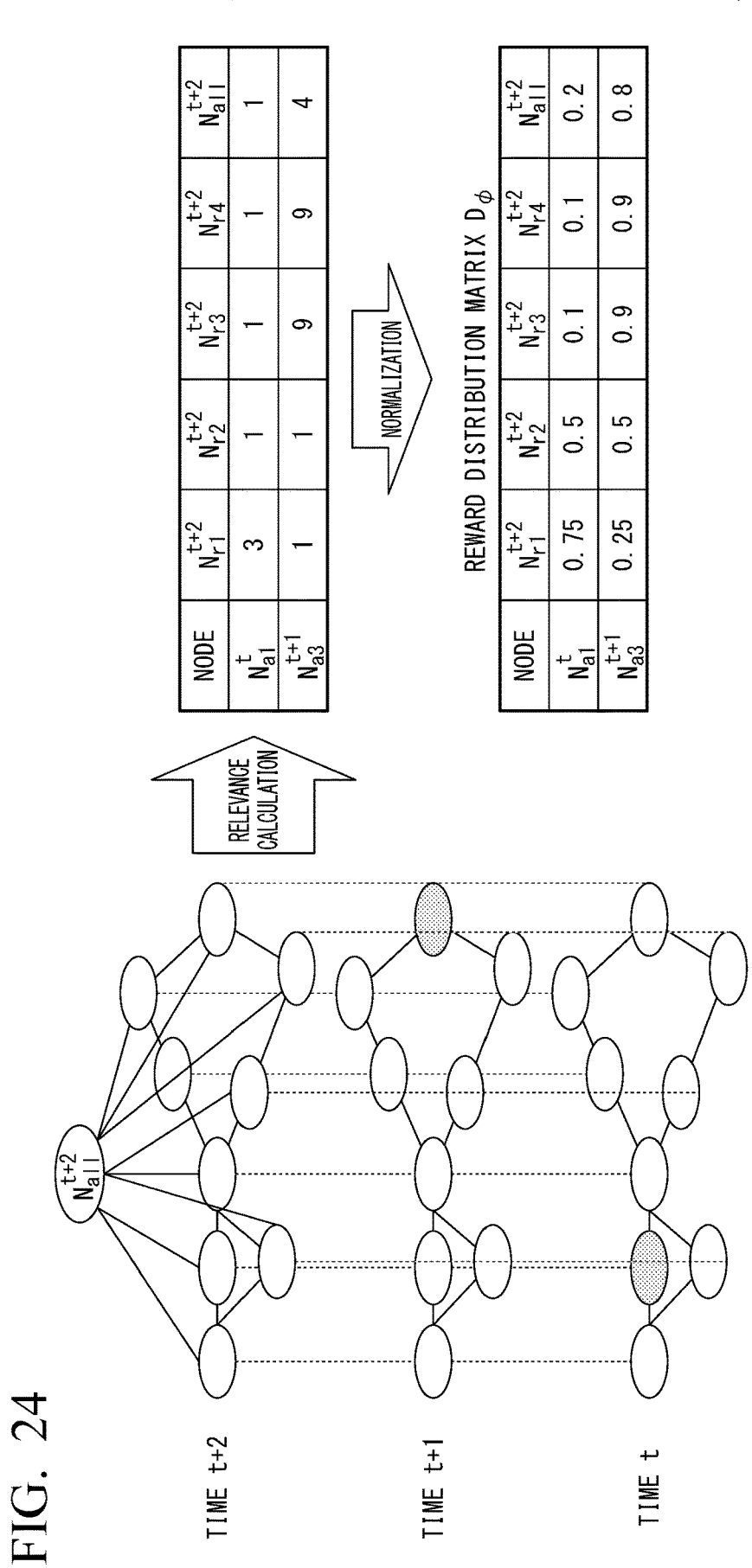
FIG. 24 is a diagram showing an example of a procedure for calculating a reward distribution matrix Dϕ from a connection graph.

FIG. 24 is a diagram showing an example of a procedure for calculating the reward distribution matrix $D\phi$ from the connection graph. In FIG. 24, nodes displayed in black are operation nodes that have acted at respective times and there is a node $N_{all}^{t+2}$ equidistant from all nodes at time t+2. The reward distribution unit 90A calculates relevance scores of the reward nodes and the node $N_{all}^{t+2}$ at time t+2 with respect to actions of the operation nodes that have been performed at times t and t+1 using an arbitrary function and normalizes the relevance scores such that they sum to 1 in the operation node direction to generate a reward distribution matrix $D\phi$.

FIG. 25 is a diagram showing an example of how a reward vector $(R_t, R_{t+1})^T$ is derived. The reward distribution unit 90A multiplies the reward distribution matrix $D\phi$ by the combined reward vector $R'_{t+2}$ at time t+2 from the right. For the sake of simplicity, the discount rate $\gamma$ is set to 1 in FIG. 25. As a result, a reward vector $(R_t, R_{t+1})^T$ to be given to the operation nodes at times t and t+1 is calculated. Although it is assumed in this modification that only one operation node acts at one time, this modification can be combined with the method of the sixth embodiment such that it is applied even when a plurality of nodes act at one time.

According to the sixth embodiment and its modification described above, the further provision of the reward distribution unit 90 (or 90A) can improve the problems of factor interpretation and scalability.

According to at least one embodiment described above, the data acquisition unit (10) configured to acquire graph-structured data describing a connection relation between nodes, the setting unit (30) configured to set a first network representing the graph-structured data acquired by the data acquisition unit, and the reinforcement learning unit (70) configured to derive a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward are provided, whereby it is possible to learn a network for controlling a control target more accurately and with a lower load.

Although some embodiments of the present invention have been described, these embodiments have been presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention as well as in the scope of the invention described in the claims and their equivalents.

What is claimed is:

1. A data processing apparatus comprising:
a data acquisition unit configured to acquire graph-structured data describing a connection relation between nodes;
a setting unit configured to set a first network representing the graph-structured data acquired by the data acquisition unit; and
a reinforcement learning unit configured to derive a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward,
wherein the setting unit is configured to set a second network having a same form as at least a part of the first network such that the second network is connected to an evaluation target node of the output layer in the first network, and
the reinforcement learning unit is configured to simultaneously derive the parameter of the first network and a parameter of the second network.

2. The data processing apparatus according to claim 1, wherein the setting unit is configured to set the first network such that the first network includes a plurality of evaluation target nodes and the reinforcement learning unit is configured to derive the parameter of the first network such that a feature quantity in an output layer of each of the plurality of evaluation target nodes approaches a corresponding one of a plurality of rewards.

3. The data processing apparatus according to claim 2, wherein the reinforcement learning unit is configured to set a degree of importance for a feature quantity in an output layer of each of the plurality of evaluation target nodes and to derive the parameter of the first network such that a feature quantity having a high degree of importance preferentially approaches a reward.

4. The data processing apparatus according to claim 1, wherein the setting unit is configured to set the first network such that the first network includes a plurality of operation nodes and a plurality of evaluation target nodes and the reinforcement learning unit is configured to derive the parameter of the first network such that a feature quantity in an output layer of each of the plurality of operation nodes becomes a feature quantity causing a feature quantity in an output layer of each of the plurality of evaluation target nodes to approach a reward.

5. The data processing apparatus according to claim 1, wherein the reinforcement learning unit is configured to derive the parameters of the first network and the second network such that a feature quantity of an output layer of the operation node in the first network approaches a reward obtained from a node of an output layer for the operation node in the second network.

6. The data processing apparatus according to claim 1, wherein the setting unit is configured to provide a time series processing layer in the first network closer to the output layer of the first network than to an input layer thereof.

7. The data processing apparatus according to claim 1, further comprising a reward distribution unit configured to derive relation information representing a relation between the first network, the operation node, and the reward on the basis of the graph-structured data and to distribute the reward to the operation node on the basis of the derived relation information.

8. The data processing apparatus according to claim 7, wherein the reward distribution unit is configured to automatically derive a parameter of the relation information on the basis of a relationship between an action performed by the operation node and a reward distributed thereto.

9. A data processing method comprising:
a computer acquiring graph-structured data describing a connection relation between nodes;
setting a first network representing the acquired graph-structured data;
deriving a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward;
setting a second network having a same form as at least a part of the first network such that the second network is connected to an evaluation target node of the output layer in the first network; and
simultaneously deriving the parameter of the first network and a parameter of the second network.

10. A non-transitory computer-readable storage medium storing a program causing a computer to:
acquire graph-structured data describing a connection relation between nodes;
set a first network representing the acquired graph-structured data;
derive a parameter of the first network such that a feature quantity of an output layer of an evaluation target node in the first network approaches a reward and a feature quantity of an output layer of an operation node becomes a feature quantity causing the feature quantity of the output layer of the evaluation target node to approach the reward;
set a second network having a same form as at least a part of the first network such that the second network is connected to an evaluation target node of the output layer in the first network; and
simultaneously derive the parameter of the first network and a parameter of the second network.

* * * * *